US012277908B2

(12) United States Patent
Kim

(10) Patent No.: US 12,277,908 B2
(45) Date of Patent: Apr. 15, 2025

(54) DISPLAY APPARATUS AND CHARGING DEVIATION COMPENSATION METHOD THEREOF

(71) Applicant: LG Display Co., Ltd., Seoul (KR)

(72) Inventor: Hyun Chul Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/485,933

(22) Filed: Oct. 12, 2023

(65) Prior Publication Data

US 2024/0194143 A1 Jun. 13, 2024

(30) Foreign Application Priority Data

Dec. 13, 2022 (KR) ........................ 10-2022-0173755

(51) Int. Cl.
*G09G 3/3258* (2016.01)

(52) U.S. Cl.
CPC ... *G09G 3/3258* (2013.01); *G09G 2310/0291* (2013.01); *G09G 2320/0223* (2013.01); *G09G 2320/0233* (2013.01)

(58) Field of Classification Search
CPC ... G09G 2310/0291; G09G 2320/0223; G09G 2320/0233; G09G 3/3258; G09G 3/3688
See application file for complete search history.

(56) References Cited

U.S. PATENT DOCUMENTS

| | | | | | |
|---|---|---|---|---|---|
| 7,742,019 | B2 * | 6/2010 | Takahara | G09G 3/2014 345/76 |
| 10,957,265 | B2 * | 3/2021 | Lee | G09G 3/3607 |
| 11,922,862 | B2 * | 3/2024 | Park | G09G 3/32 |
| 12,020,613 | B2 * | 6/2024 | Seo | G09G 3/3233 |
| 2003/0052854 | A1 * | 3/2003 | Juang | G09G 3/3688 345/96 |
| 2007/0290979 | A1 * | 12/2007 | Lee | G09G 3/3685 345/100 |
| 2012/0162185 | A1 * | 6/2012 | Park | G09G 3/3611 345/212 |
| 2014/0267206 | A1 * | 9/2014 | Takani | G09G 3/3688 345/94 |
| 2015/0279272 | A1 * | 10/2015 | Takahara | G09G 3/3233 345/76 |
| 2017/0069275 | A1 * | 3/2017 | Sengoku | G09G 3/3677 |
| 2017/0154598 | A1 * | 6/2017 | Park | G09G 3/3688 |
| 2018/0308414 | A1 * | 10/2018 | Kang | G09G 3/3614 |

(Continued)

*Primary Examiner* — Chun-Nan Lin
(74) *Attorney, Agent, or Firm* — Seed IP Law Group LLP

(57) ABSTRACT

A display apparatus includes where one pixel line including a plurality of pixels are provided in plurality, a gate driver configured to apply a gate signal to the one pixel line, and a source driver configured to apply a data signal to the one pixel line. The source driver includes amplifier circuits, output switches, a source output control circuit, and an offset control circuit. The source output control circuit applies sequentially delayed source output enable signals to the output switches to delay an output period of the data signal by units of source output channels, based on a degree of delay of the gate signal. The offset control circuit applies an offset control signal generated based on the sequentially delayed source output enable signals to the plurality of amplifier circuits to change an offset of each of the plurality of amplifier circuits in a masking period of the data signal.

13 Claims, 28 Drawing Sheets

(56) References Cited

U.S. PATENT DOCUMENTS

| | | | | |
|---|---|---|---|---|
| 2019/0035341 | A1* | 1/2019 | Lee | G02F 1/136213 |
| 2020/0335033 | A1* | 10/2020 | Kim | G09G 3/3611 |
| 2024/0233681 | A1* | 7/2024 | Choi | G09G 3/3266 |

* cited by examiner

DISPLAY APPARATUS AND CHARGING DEVIATION COMPENSATION METHOD THEREOF

CROSS-REFERENCE TO RELATED APPLICATIONS

This application claims the benefit and priority to the Korean Patent Application No. 10-2022-0173755 filed on Dec. 13, 2022, which is hereby incorporated by reference and for all purpose as if fully set forth herein.

BACKGROUND

Technical Field

The present disclosure relates to a display apparatus and a charging deviation compensation method thereof.

Description of the Related Art

Display apparatuses include a display panel where a plurality of pixels are provided, a gate driver which supplies a scan signal to the display panel, and a source driver which supplies a data signal to the display panel. A plurality of pixel lines is provided in the display panel, and each of the pixel lines includes a plurality of pixels. While a gate signal is being applied to a pixel line, pixels of the pixel line are simultaneously charged with data signals.

The gate signal applied in a horizontal direction is delayed due to an internal load of the display panel, and the amount of delay of the gate signal increases progressively in a direction distancing from the gate driver. For example, the amount of delay of the gate signal increases relatively more in a center portion of the display panel, disposed far away from the gate driver, than an edge portion of the display panel disposed relatively close to the gate driver.

BRIEF SUMMARY

The inventors have realized that in the display devices of the related art, due to a delay deviation of the gate signal, the charging amount of pixel with the same data signal is changed in the edge portion and the center portion of the display panel. Thus, luminance non-uniformity occurs between the edge portion and the center portion of the display panel. Luminance non-uniformity caused by a position-based charging deviation of the display panel degrades image quality.

To overcome one or more technical limitation in the related art including the aforementioned problem of the related art, the various embodiments of the present disclosure may provide a display apparatus and a charging deviation compensation method thereof, which may compensate for a position-based charging deviation of a display panel.

To achieve these technical benefits and other advantages, one aspect of the inventive concepts, as embodied and broadly described herein, a display apparatus includes a display panel where one pixel line including a plurality of pixels are provided in plurality, a gate driver configured to apply a gate signal to the one pixel line, and a source driver configured to apply a data signal to the one pixel line, wherein the source driver includes a plurality of amplifier circuits corresponding to a plurality of source output channels, a plurality of output switches connected between the plurality of amplifier circuits and the plurality of source output channels, a source output control circuit configured to apply sequentially delayed source output enable signals to the plurality of output switches to delay an output period of the data signal by units of source output channels, based on a degree of delay of the gate signal.

In accordance with another aspect of the inventive concepts, as embodied and broadly described herein, a charging deviation compensation method of a display apparatus including a display panel where one pixel line including a plurality of pixels are provided in plurality, a gate driver applying a gate signal to the one pixel line, and a source driver applying a data signal to the one pixel line wherein the source driver includes a plurality of amplifier circuits corresponding to a plurality of source output channels and a plurality of output switches connected between the plurality of amplifier circuits and the plurality of source output channels, the charging deviation compensation method comprising: a first step of applying sequentially delayed source output enable signals to the plurality of output switches to delay an output period of the data signal by units of source output channels, based on a degree of delay of the gate signal.

According to the present disclosure, luminance non-uniformity occurred between the edge portion and the center portion of the display panel can be prevented, minimized or at least reduced and image quality can be increased.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
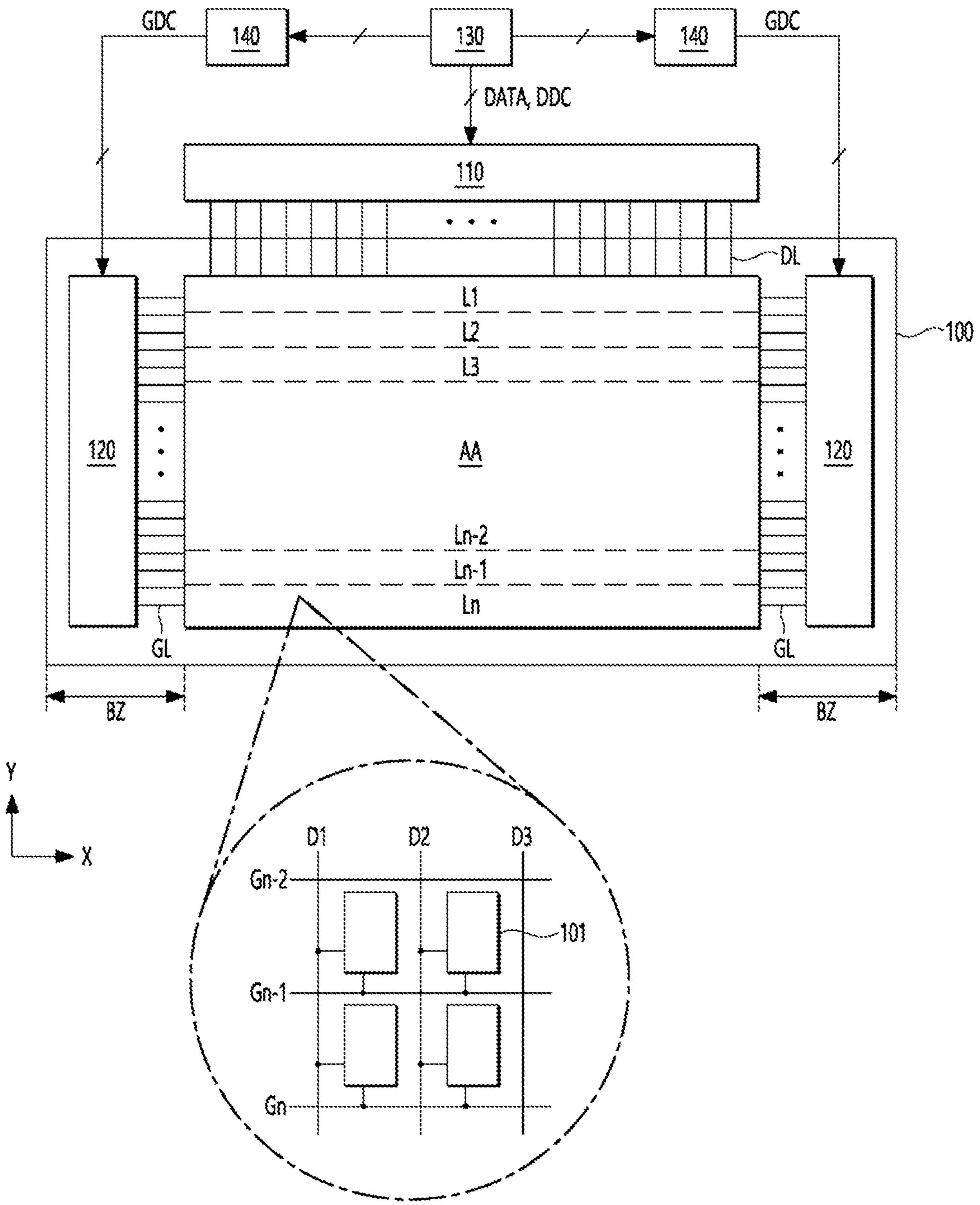
FIG. 1 is a block diagram illustrating a display apparatus according to an exemplary embodiment of the disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise," "having." "including" and the like suggest that other parts can be added unless the term "only" is used. As used herein, the singular forms "a," "an," and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~," "over~," "under~," and "next~," one or more other parts may be disposed between the two parts unless "just" or "direct" is used.

In describing a temporal relationship, when the temporal order is described as, for example, "after," "subsequent," "next," and "before," a case which is not continuous may be included unless a more limiting term, such as "just," "immediate(ly)," or "direct(ly)" is used.

The term "at least one" should be understood as including any and all combinations of one or more of the associated listed items. For example, the meaning of "at least one of a first item, a second item, and a third item" encompasses the combination of all three listed elements, combinations of any two of the three elements, as well as each individual element, the first element, the second element, and the third element.

It will be understood that, although the terms "first," "second," "A", "B", "(a)" and "(b)" etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Hereinafter, embodiments of the present disclosure will be described in detail with reference to the accompanying drawings.

Figure 2:
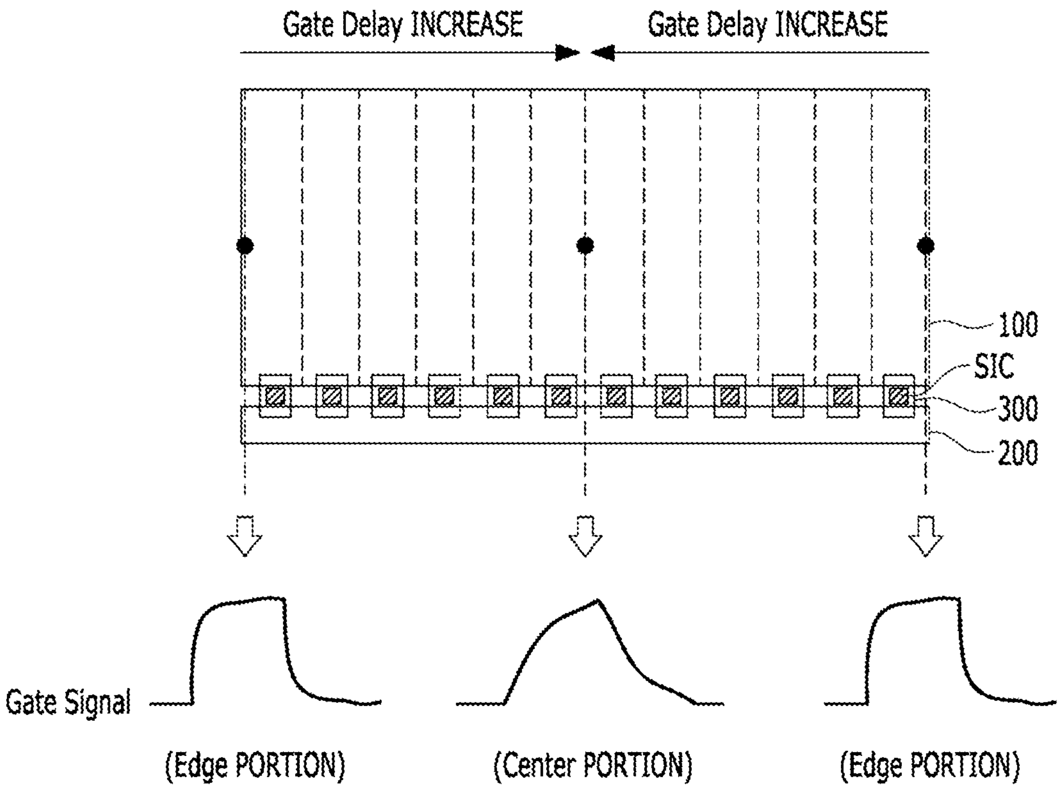
FIG. 2 is a diagram illustrating an example where a delay deviation of a gate signal occurs between an edge portion and a center portion of a display panel according to an exemplary embodiment of the disclosure.
Figure 3:
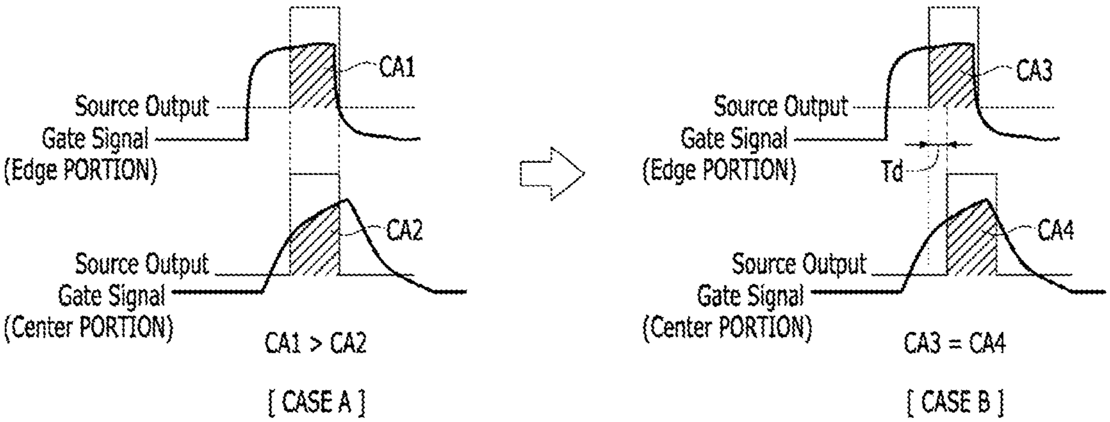
FIG. 3 is a diagram illustrating a concept for compensating for a charging deviation of a data signal caused by a delay deviation of a gate signal according to an exemplary embodiment of the disclosure.

FIG. 1 is a block diagram illustrating a display apparatus according to an exemplary embodiment of the disclosure. FIG. 2 is a diagram illustrating an example where a delay deviation of a gate signal occurs between an edge portion and a center portion of a display panel according to an exemplary embodiment of the disclosure. FIG. 3 is a diagram illustrating a concept for compensating for a charging deviation of a data signal caused by a delay deviation of a gate signal according to an exemplary embodiment of the disclosure.

A display panel 100 may include a display area AA which reproduces an input image. The display area AA may include a pixel array which displays pixel data (hereinafter referred to as "image data") DATA of an input image. The pixel array may include a plurality of data lines DL, a plurality of gate lines GL intersecting with the data lines DL, and a plurality of pixels.

The pixels may be arranged on the display area AA in a matrix type defined by the data lines DL and the gate lines GL. The pixels may be arranged as various types, such as a type which shares pixels emitting lights having the same color, a stripe type, and a diamond type as well as a matrix type, on the display area AA.

The pixel array may include a plurality of pixel columns and a plurality of pixel lines L1 to Ln intersecting with each of the pixel columns. Each of the pixel columns may include pixels which are arranged in a Y-axis direction. Each of the pixel lines may include pixels which are arranged in an X-axis direction. One vertical period may be one frame period needed for writing image data DATA of one frame in all pixels of the screen. One horizontal period may be a time obtained by dividing one frame period by the total number of pixel lines L1 to Ln. One horizontal period may be a time needed for writing the image data DATA of one pixel line, sharing a gate line GL, in pixels of one pixel line.

Each of the pixels may include a red (R) subpixel 101, a green (G) subpixel 101, and a blue (B) subpixel 101 for implementing colors. Each pixel may further include a white subpixel 101. Each of the pixels may include subpixels of other colors, such as cyan, magenta, or yellow, etc. Hereinafter, "pixel" and "sub-pixel" may be used interchangeably.

In an organic light emitting display apparatus, a pixel circuit may include a light emitting device, a driving element, one or more switch elements, and a capacitor. Various configurations of the pixel circuit are possible, for example, a number of transistors which function as driving element and switch elements, in the pixel circuit of the present disclosure may be three or more, and a number of capacitors may be one or more, for example, the pixel circuit of the present disclosure also be a 3T1C pixel circuit including three transistors and one storage capacitor, a 3T2C pixel circuit including three transistors and two storage capacitors, a 5T1C pixel circuit including five transistors and one storage capacitor, a 5T2C pixel circuit including five transistors and two storage capacitors, a 7T2C pixel circuit including seven transistors and two storage capacitors, or the like, and the present disclosure is not limited thereto. The light emitting device may be implemented as an organic light emitting diode (OLED) or an inorganic light emitting diode. A current of the OLED may be adjusted based on a gate-source voltage of the driving element. The driving element and the switch element may each be implemented as a P-type or N-type transistor. A semiconductor layer of a transistor may include amorphous silicon or polysilicon such as a low temperature poly-silicon LTPS. A semiconductor layer of at least some of transistors may include oxide. For example, the semiconductor layer may include a metal oxide, such as IGZO. The pixel circuit may be connected with a data line DL and a gate line GL. In FIG. 1, "D1 to D3" illustrated in a circle may be data lines, and "Gn−2 to Gn" may be gate lines. Each of the subpixels 101 of FIG. 1 may include the same pixel circuit.

A display panel driver may include a source driver 110 and a gate driver 120. The display panel driver may write the image data DATA in the pixels of the display panel 100, based on control by a timing controller 130.

The source driver 110 may convert the image data DATA, received from the timing controller 130 to be written to the pixels, into gamma compensation voltages every frame period by using a digital-to-analog converter (DAC) to generate data voltages. The gamma reference voltage VGMA is divided into gamma compensation voltages for respective gray scales through a voltage divider circuit. The gamma compensation voltage for each gray scale may be provided to the DAC. The data voltage may be outputted through an output buffer in each of the channels of the source driver 110. The source driver 110 may supply the data voltages to the data lines DL. The data voltages may be supplied to the data lines DL and may be applied to the driving elements through the switch elements of each subpixel 101. The source driver 110 may be implemented with a plurality of source driving integrated circuits (SDICs) mounted on a conductive film 300 as illustrated in FIG. 2. The conductive film 300 may electrically connect a source printed circuit board (PCB) 200 with the display panel 100. For example, each source driver integrated circuit (SDIC) may be connected to the display panel by a tape automated bonding (TAB) method, may be connected to a bonding pad of the display panel by a chip on glass (COG) or chip on panel (COP) method, or may be implemented in a chip on film (COF) method and connected to the display panel.

A gate driver 120 may be provided in a bezel region BZ (also called non-display area) which is outside a display area and does not display an image on the display panel 100. The gate driver 120 may be disposed in the bezel area BZ on one side of the display panel to supply the gate pulse to the gate lines in a single feeding method. In addition, the gate driver may be disposed in the bezel areas BZ on both sides of the display panel with the display area AA interposed therebetween and may supply the gate pulse to the gate lines in a double feeding method. The gate driver 120 may sequentially supply a gate signal, synchronized with data voltages, to the gate lines GL according to control by the timing controller 130. The gate signal may simultaneously activate pixels of a pixel line into which the data voltages are charged. The gate driver 120 may output the gate signal by using one or more shift registers and may shift the gate signal. The gate signal may include one or more scan signals. The gate driver 120 may be connected to the display panel by a tape automated bonding (TAB) method, may be connected to the bonding pad of the display panel by a chip on glass (COG) method or a chip on panel (COP) method, or may be connected to the display panel by a chip on film (COF) method.

The gate signal applied to the gate line GL may be delayed due to an internal load of the display panel, and the amount of delay of the gate signal may increase progressively in a direction distancing from the gate driver 120. For example, the amount of delay of the gate signal may increase relatively more in a center portion of the display panel 100, disposed far away from the gate driver 120, than an edge portion of the display panel 100 disposed relatively close to the gate driver 120.

When a delay deviation of the gate signal occurs, with respect to a source output (e.g., a data voltage) having the same level, an amount of pixel charging CA1 of the edge portion of the display panel 100 may increase more than an amount of pixel charging CA2 of the center portion of the display panel 100, and thus, luminance non-uniformity between the edge portion and the center portion of the display panel 100 may occur (see a case A of FIG. 3).

To reduce a position-based charging deviation of the display panel, the source driver 110 may differently adjust a position-based source output timing of the display panel 100. The source driver 110 may delay a source output timing, based on the degree of delay of the gate signal. For example, as in a case B of FIG. 3, the source driver 110 may delay a source output timing by “Td” at the center portion with respect to the edge portion of the display panel 100, and thus, an amount of pixel charging CA3 of the edge portion of the display panel 100 may be equal to an amount of pixel charging CA4 of the center portion of the display panel 100.

The timing controller 130 may receive the image data DATA and a timing signal, synchronized with the image data DATA, from an external system such as a host system (not shown). The timing signal may include a vertical synchronization signal Vsync, a horizontal synchronization signal Hsync, a clock signal DCLK, a data enable signal DE and the like. The vertical synchronization signal Vsync may define a vertical period. The horizontal synchronization signal Hsync may define a horizontal period. The data enable signal DE may define a time for which the image data DATA is transferred in the vertical period or the horizontal period. The data enable signal may have a cycle of one horizontal period. The vertical period and the horizontal period may be previously known by a method of counting the data enable signal DE, and thus, the vertical synchronization signal Vsync and the horizontal synchronization signal Hsync may be omitted.

The timing controller 130 may generate a source timing control signal DDC for controlling an operation timing of the source driver (or data driver) 110 and a gate timing control signal GDC for controlling an operation timing of the gate driver 120, based on the timing signal Vsync, Hsync, and DE received for example, from the host system. The timing controller 130 synchronizes the data driver 110 and/or the gate driver 120 by controlling the operation timing of the display panel driver. The source timing control signal DDC may include a source sampling clock, a polarity control signal, a source output enable signal and the like. The source sampling clock SSC is a clock for sampling the image data DATA, and the source output enable signal is a signal for setting an output timing (i.e., a source output timing) of a data voltage.

The timing controller 130 may multiply an input frame frequency by i (where i is a natural number) to control an operation timing of each of a display panel driver (e.g., the data driver 110 and the gate driver 120) with “input frame frequency×frame frequency of i Hz”. The input frame frequency may be about 60 Hz in national television standards committee (NTSC) and may be about 50 Hz in phase-alternating line (PAL), but is not limited thereto. In order to lower a refresh rate of the pixels P in the low-speed driving mode, the timing controller 130 may lower the frame frequency into a frequency ranging from 1 Hz to 30 Hz.

The host system may be one of a television (TV), a tablet computer, a laptop computer, a vehicle system, a set-top box, a navigation system, a personal computer (PC), a home theater, an automotive display system, a mobile device, and a wearable device. In the mobile device and the wearable device, the source driver 110, the timing controller 130, and a level shifter 140 may be integrated into one driving IC.

The level shifter 140 may convert a voltage of the gate timing control signal GDC (for example, a start signal VST, an on clock (On CLK), and an off clock (Off CLK)), output from the timing controller 130, into a gate high voltage VGH or a gate low voltage VGL and may supply the gate high voltage VGH or the gate low voltage VGL to the gate driver 120. A low level voltage of the gate timing control signal GDC may be converted into the gate low voltage VGL, and a high level voltage of the gate timing control signal GDC may be converted into the gate high voltage VGH. A scan pulse output from the gate driver 120 may can swing between VGH and VGL. The gate high voltage (VGH) may be a gate-on voltage for turning on a switch TFT of the pixel circuit. The gate low voltage (VGL) may can be a gate-off voltage for turning off the switch TFT of the pixel circuit. But the present disclosure is not limited thereto. The gate high voltage (VGH) may can also be a gate-off voltage for turning off a switch TFT of the pixel circuit, when the switch TFT is implemented as a PMOS transistor. In addition, embodiments are not limited thereto. As an example, the level shifter 140 may be omitted according to the design. In this case, the gate timing control signal outputted from timing controller 130 may be inputted to the gate driver 120 directly.

The timing controller 130 may transfer the image data DATA to the source driving ICs SIC through an internal interface circuit. The internal interface circuit may be implemented as an embedded clock point to point interface (EPI), but is not limited thereto.

Figure 4:
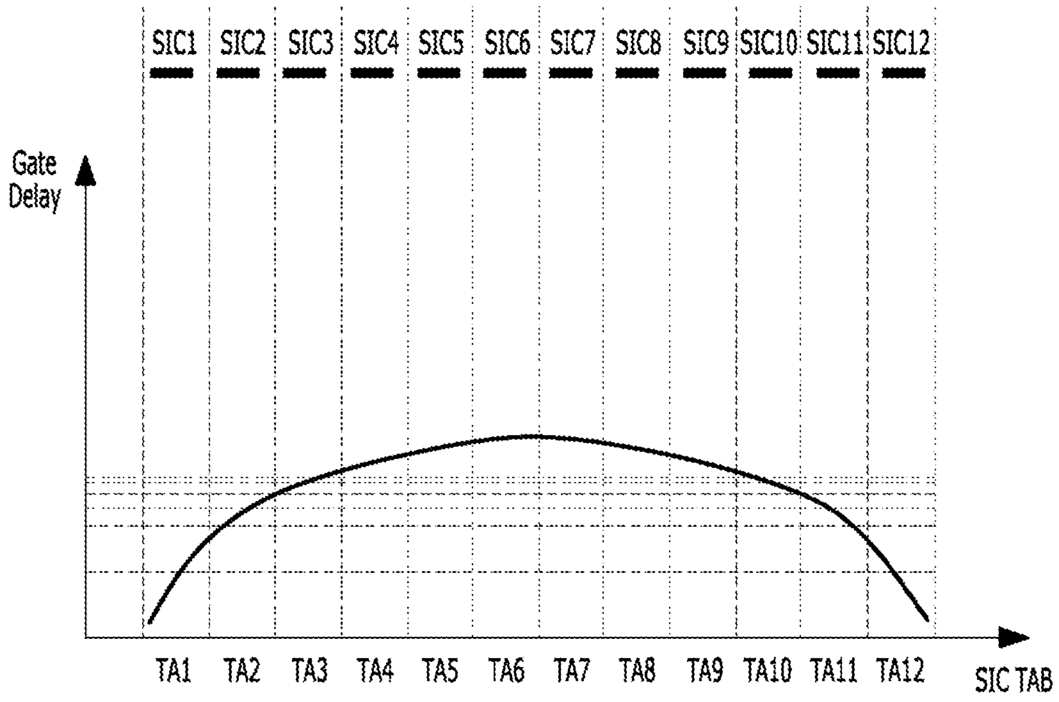
FIG. 4 is a diagram illustrating an example where a delay deviation of a gate signal occurs in a display panel according to an exemplary embodiment of the disclosure.
Figure 5A:
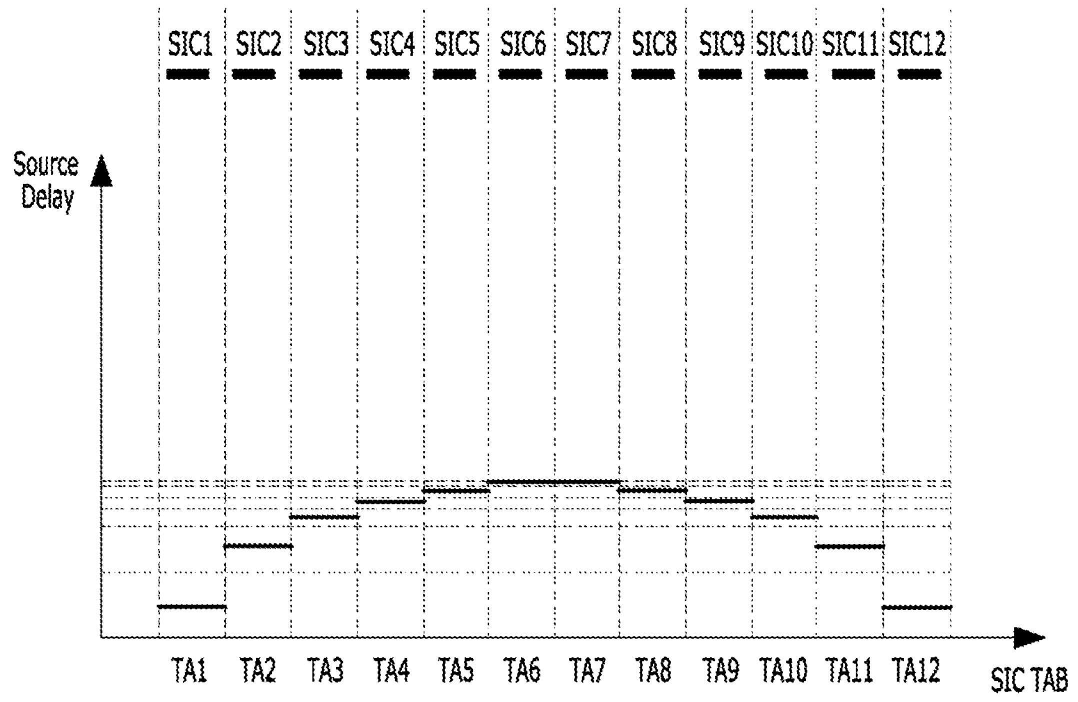
FIGS. 5A and 5B are diagrams illustrating methods for compensating for a gate delay deviation of FIG. 4 by differently adjusting position-based source delay according to an exemplary embodiment of the disclosure.
Figure 5B:
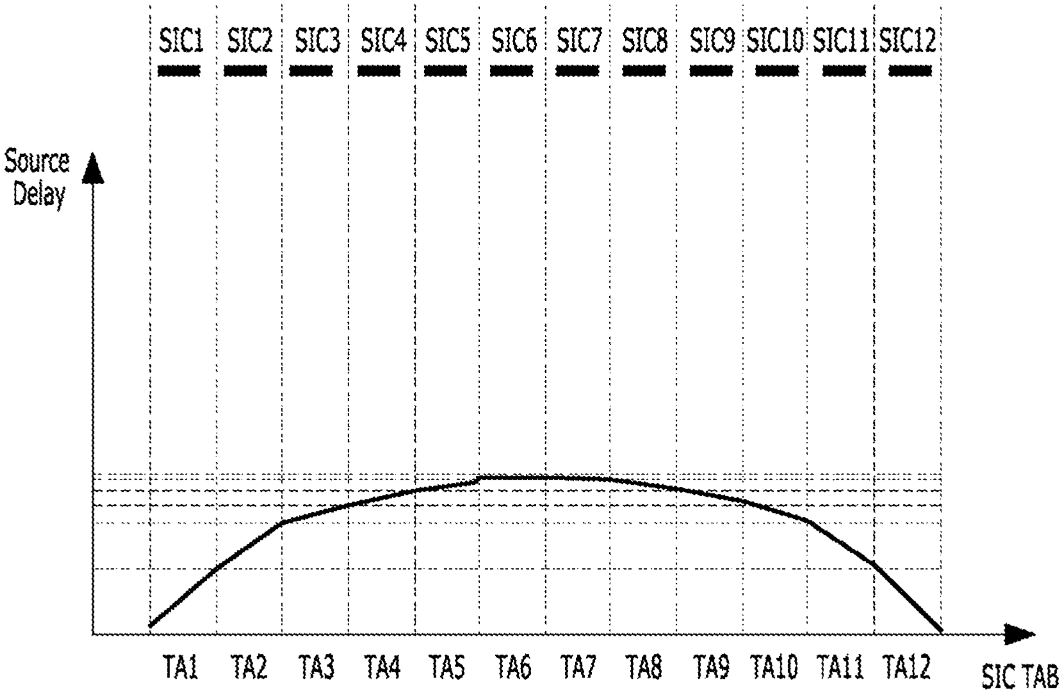
Figure 6:
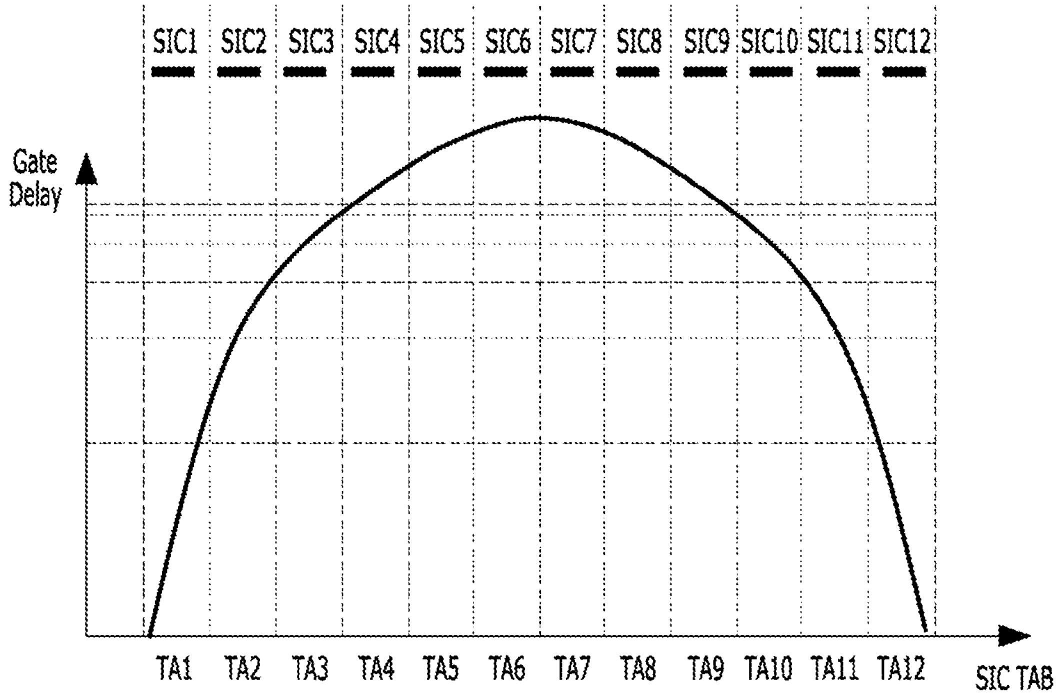
FIG. 6 is a diagram illustrating another example where a delay deviation of a gate signal occurs in a display panel according to an exemplary embodiment of the disclosure.
Figure 7A:
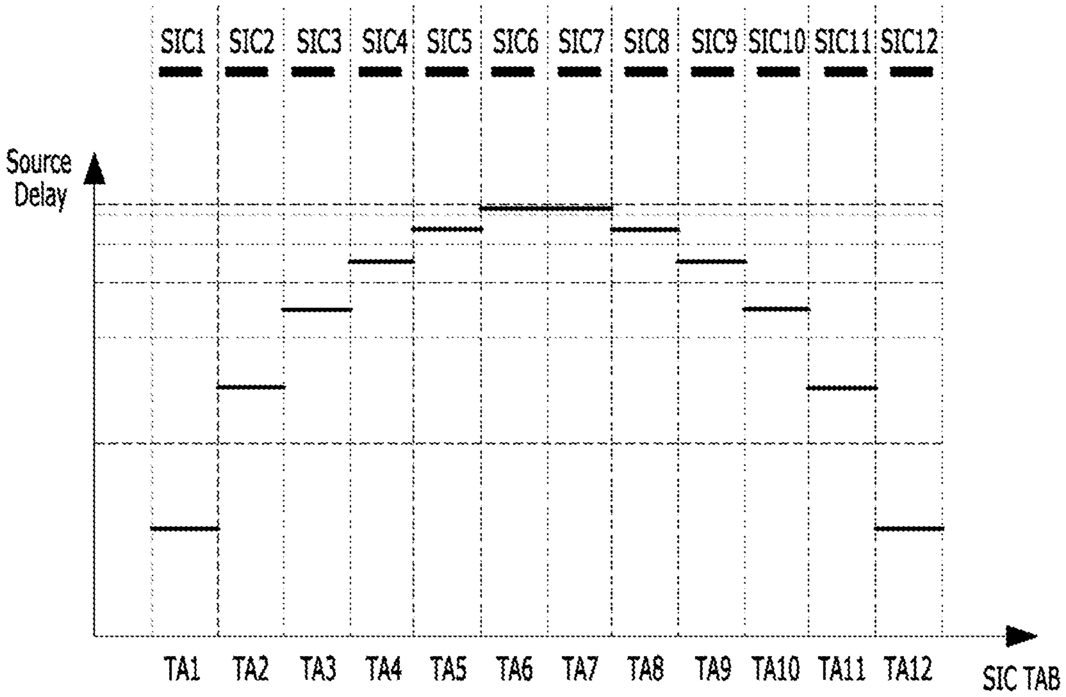
FIGS. 7A and 7B are diagrams illustrating methods for compensating for a position-based gate delay deviation of FIG. 6 by differently adjusting position-based source delay according to an exemplary embodiment of the disclosure.
Figure 7B:
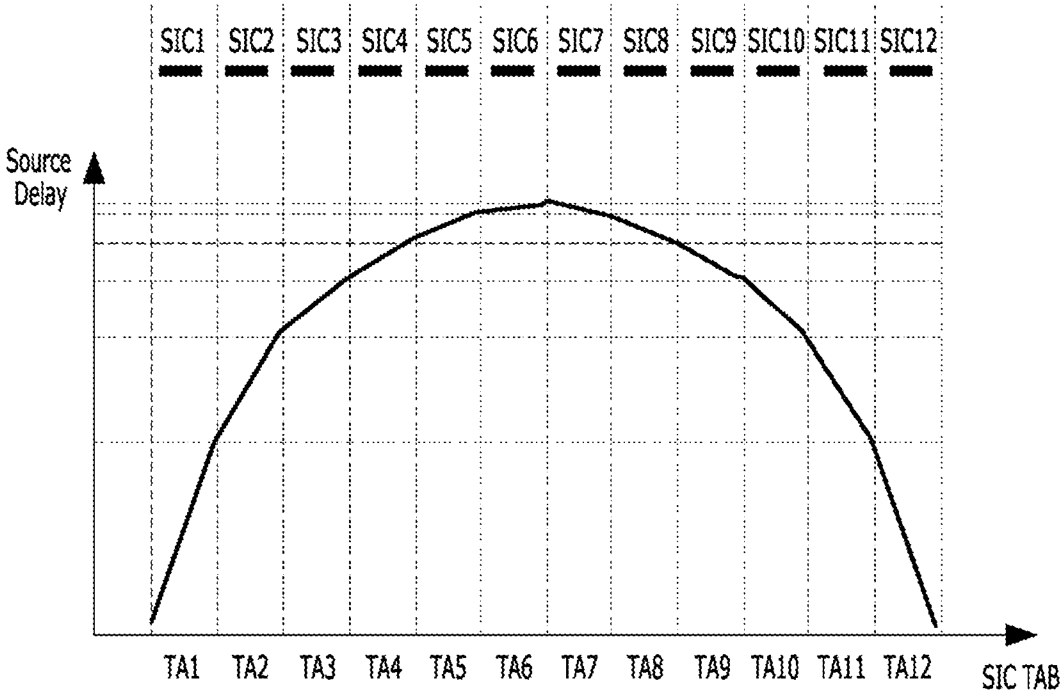

FIG. 4 is a diagram illustrating an example where a delay deviation of a gate signal occurs in a display panel according to an exemplary embodiment of the disclosure. FIGS. 5A and 5B are diagrams illustrating methods for compensating for a gate delay deviation of FIG. 4 by differently adjusting position-based source delay according to an exemplary embodiment of the disclosure. FIG. 6 is a diagram illustrating another example where a delay deviation of a gate signal occurs in a display panel according to an exemplary embodiment of the disclosure. FIGS. 7A and 7B are diagrams illustrating methods for compensating for a position-based gate delay deviation of FIG. 6 by differently adjusting position-based source delay according to an exemplary embodiment of the disclosure.

Referring to FIGS. 4 to 7B, a plurality of source driving ICs SIC1 to SIC12 may be used for driving a large-area display panel. Each of the source driving ICs SIC1 to SIC12 may include one group of source output channels. Each of the source output channel in the one group of source output channels may define one tap region. Accordingly, a plurality of tap regions TA1 to TA12 may be defined by the plurality of source driving ICs SIC1 to SIC12.

FIG. 4 is a diagram illustrating an example where a position-based delay deviation of a gate signal in a display panel is small according to an exemplary embodiment of the disclosure. FIG. 6 is a diagram illustrating another example where a position-based delay deviation of a gate signal in a display panel is large according to an exemplary embodiment of the disclosure.

FIGS. 5A and 7A show results when source delay corresponding to the degree of position-based delay of a gate signal is applied to only source driving ICs SIC1 to SIC12. In FIGS. 5A and 7A, different source delays may be applied to the source driving ICs SIC1 to SIC12, but the same source delay may be applied to a plurality of source output channels of the same source driving IC. Accordingly, the amount of source delay may be discontinuous, i.e., discrete in adjacent tap regions TA1 to TA12.

On the other hand, FIGS. 5B and 7B show results when source delay corresponding to the degree of position-based delay of a gate signal is applied to source driving ICs SIC1 to SIC12 and is applied to source output channels of each source driving IC. In FIGS. 5B and 7B, different source delays may be applied to a plurality of source output channels of the same source driving IC as well as the source driving ICs SIC1 to SIC12. Accordingly, the amount of source delay may be continuous i.e., non-discrete in adjacent tap regions TA1 to TA12.

When a position-based delay deviation of a gate signal is small as in FIG. 4, there may be no large difference between an inter-IC delay adjustment result as in FIG. 5A and an inter-IC delay and in-IC delay adjustment result as in FIG. 5B.

However, when a position-based delay deviation of a gate signal is large as in FIG. 6, a large difference may occur between an inter-IC delay adjustment result as in FIG. 7A and an inter-IC delay and in-IC delay adjustment result as in FIG. 7B. In this case, therefore, source delay corresponding to the degree of position-based delay of a gate signal as in FIG. 7B should be applied to source output channels of the source driving IC as well as adjacent source driving ICs.

In the following descriptions of embodiments, various embodiments will be described where different source delays are applied to a plurality of source output channels in one source driving IC.

Figure 8:
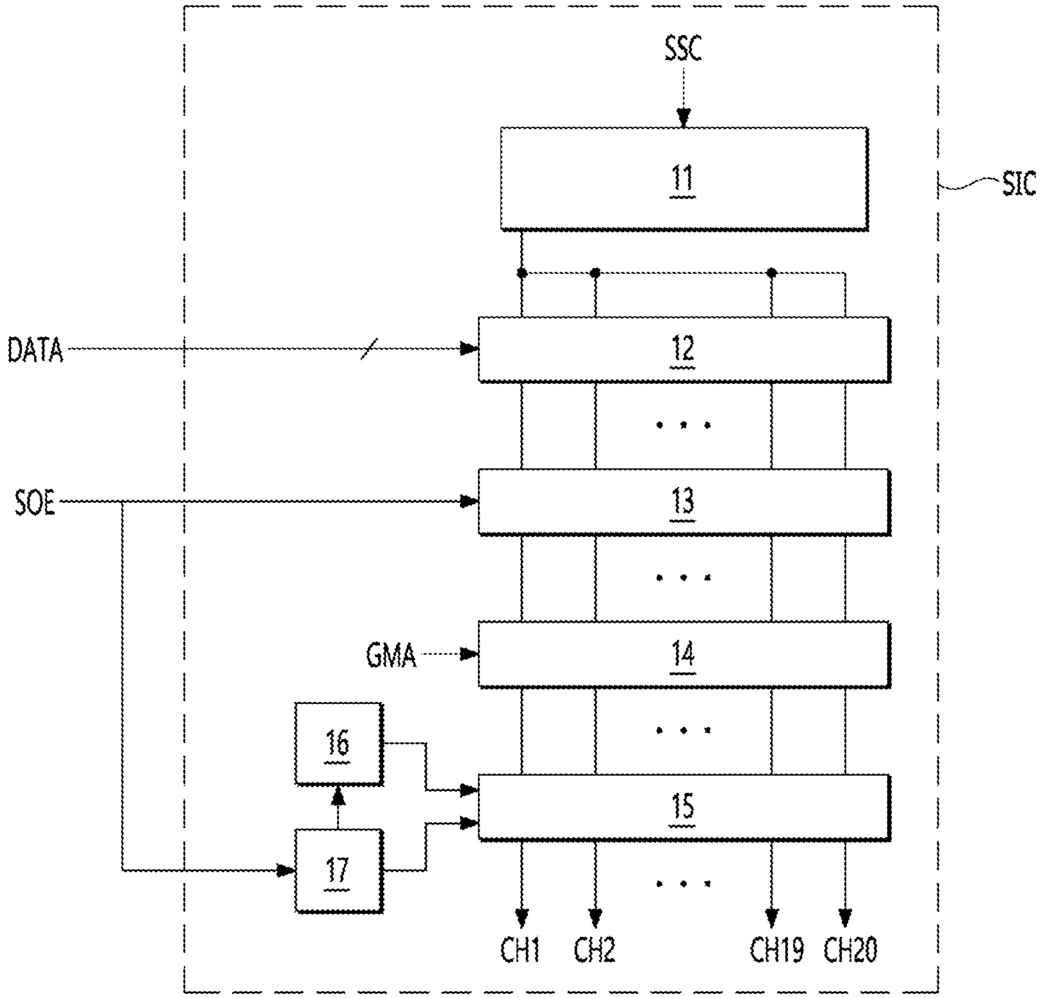
FIG. 8 is a diagram illustrating a configuration of a source driving chip for implementing source delay illustrated in FIG. 5B or 7B according to an exemplary embodiment of the disclosure.
Figure 9:
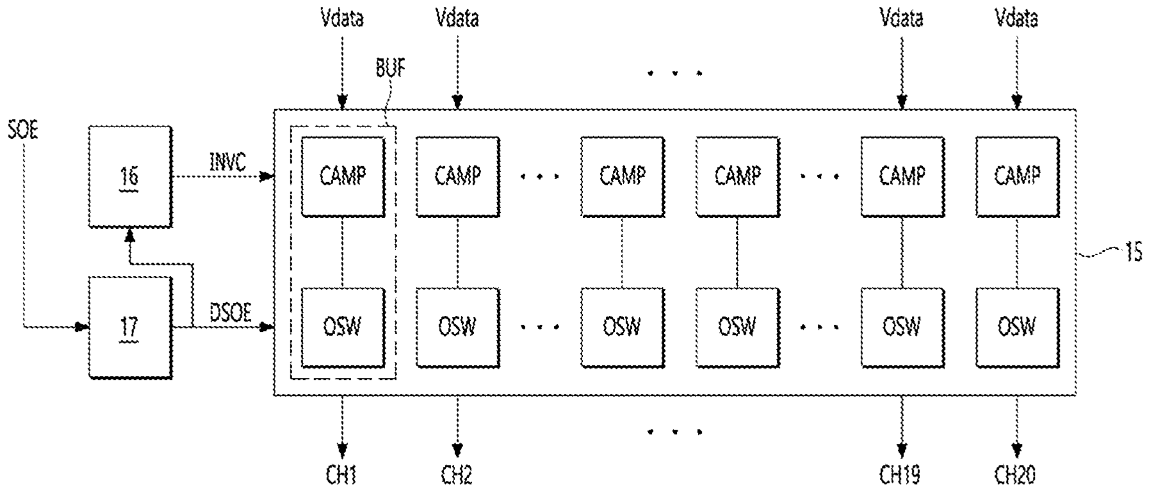
FIG. 9 is a block diagram illustrating an output buffer circuit of FIG. 8 according to an exemplary embodiment of the disclosure.

FIG. 8 is a diagram illustrating a configuration of a source driving chip for implementing source delay (inter-IC delay and in-IC delay) illustrated in FIG. 5B or 7B according to an exemplary embodiment of the disclosure. FIG. 9 is a block diagram illustrating an output buffer circuit of FIG. 8 according to an exemplary embodiment of the disclosure.

Referring to FIGS. 8 and 9, a source driving IC SIC may include a shifter register 11, a first latch 12, a second latch 13, a digital-to-analog converter 14, an output buffer circuit 15, an offset control circuit 16, and a source output control circuit 17, but is not limited thereto. Other elements not shown or less elements than shown may be included in the source driving IC SIC.

The shifter register 11 may receive image data DATA through interface, sample bits of the image data DATA on the basis of a source sampling clock SSC, and provide sampled image data DATA to the first latch 12.

The first latch 12 may latch bits of the sampled image data DATA and may provide latched image data DATA to the second latch 13.

The second latch 13 may temporarily store the latched image data DATA and may output the stored image data DATA to the digital-to-analog converter 14, based on a source output enable signal SOE.

The first latch 12 and the second latch 13 may be integrated into one latch.

The digital-to-analog converter 14 may map the image data DATA, input from the second latch 13, to the gamma compensation voltages GMA to generate an analog data voltage Vdata and may provide the data voltage Vdata to the output buffer circuit 15.

The output buffer circuit 15 may include a plurality of output buffers BUF respectively corresponding to a plurality of source output channels CH1 to CH20. The output buffers BUF may include a plurality of amplifier circuits CAMP, corresponding to source output channels CH1 to CH20, and a plurality of output switches OSW connected between the amplifier circuits CAMP and the source output channels CH1 to CH20. Herein, 20 output channels are taken as an example. Needless to say, the total number of output channels is not limited to 20, and can be any integer more than 1 as needed. So is the case with the total number of amplifier circuits and that of output switches.

The source output control circuit 17 may apply predetermined in-IC delay to the source output enable signal SOE to generate source output enable signals DSOE which are sequentially delayed. The source output control circuit 17 may apply the sequentially delayed output enable signals DSOE to the output switches OSW, and thus, may delay an output timing of a data voltage Vdata by units of source output channels, based on the degree of delay of a gate signal. Accordingly, even when a position-based delay deviation of the gate signal of the display panel is large, a charging deviation of the data voltage Vdata may be effectively compensated for.

The offset control circuit 16 may generate an offset control signal INVC, based on the sequentially delayed source output enable signals DSOE. The offset control circuit 16 may apply the offset control signal INVC to the amplifier circuits CAMP to switch an offset of each of the amplifier circuits CAMP from positive "+" to negative "−" or in the reverse order thereof in the masking period of the data voltage Vdata, and thus, may prevent the amplifier offset from adversely affecting a source output in driving. The masking period refers to a period in which no data signal is output to pixels. The offset control circuit 16 may switch an offset of each of the amplifier circuits CAMP, based on a transition timing of the offset control signal INVC. Because offset switching noise may be reflected in a source output when the offset of each of the amplifier circuits CAMP is switched, the offset control signal INVC may be transitioned in a period where the output switch OSW is turned off (i.e., the masking period of the data voltage Vdata). That is, the offset of each of the amplifier circuits CAMP may be changed from (+) to (−) or from (−) to (+) in synchronization with a transition timing of the offset control signal INVC.

The masking period and the output period of the data voltage Vdata may constitute one horizontal period for an operation of one pixel line. The offset control signal INVC corresponding to the same source output channel may be transitioned at a period of one horizontal period, and thus, the amplifier offset may be complementally changed in driving. For example, the offset of each of the amplifier circuits CAMP may be changed from (+) to (−) in a masking period of an $(N-1)^{th}$ horizontal period, and may be changed from (−) to (+) in a masking period of an $N^{th}$ horizontal period, in synchronization with a transition timing of the offset control signal INVC. Alternatively, the offset of each of the amplifier circuits CAMP may be changed from (−) to (+) in a masking period of an $(N-1)^{th}$ horizontal period, and may be changed from (+) to (−) in a masking period of an $N^{th}$ horizontal period, in synchronization with a transition timing of the offset control signal INVC. Based on periodically changing of the amplifier offset, source output distortion caused by the amplifier offset may be prevented.

Figure 10:
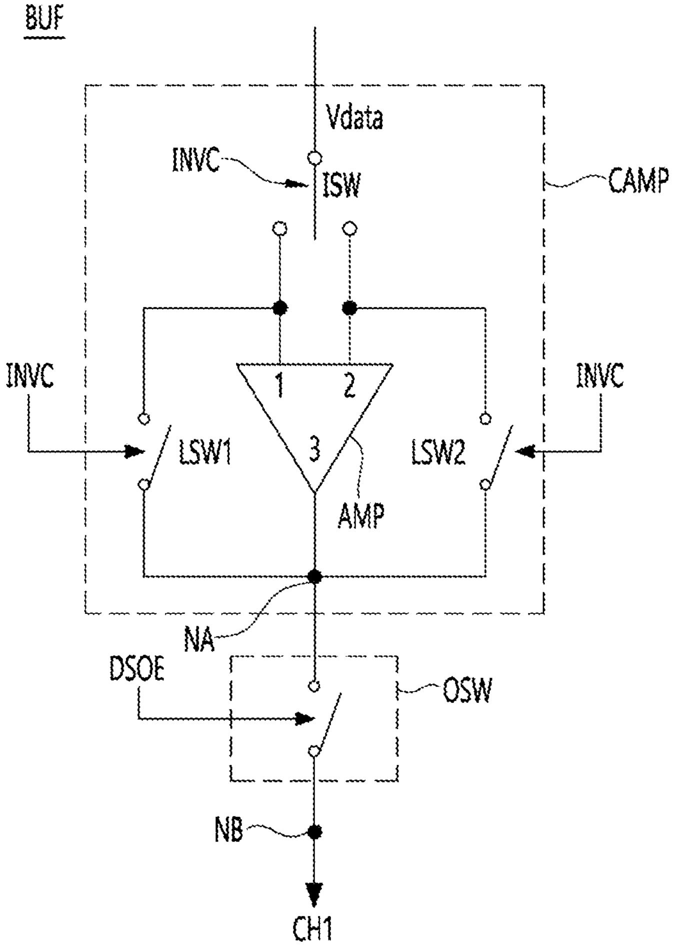
FIG. 10 is a circuit diagram illustrating an output buffer connected with a first source channel of FIG. 9 according to an exemplary embodiment of the disclosure.

FIG. 10 is a circuit diagram illustrating an output buffer connected with the first source channel of FIG. 9 according to an exemplary embodiment of the disclosure.

Referring to FIG. 10, an output buffer BUF connected with a first source channel CH1 may include an amplifier circuit CAMP and an output switch OSW.

The amplifier circuit CAMP may include an amplifier AMP, an input switch ISW, a first feedback switch LSW1, and a second feedback switch LSW2, but not limited thereto. More or less elements than shown may be included in the amplifier circuit CAMP, or another structure with the same elements as shown may be included.

The amplifier AMP may include a first input terminal 1, a second input terminal 2, and an output terminal 3. One of the first input terminal 1 and the second input terminal 2 may be a (−) input terminal, and the other may be a (+) input terminal. The output terminal 3 may be connected with the output switch OSW through a first node NA. The output switch OSW may be connected with the first source channel CH1 through a second node NB and may be turned on/off based on a delayed source output enable signal DSOE.

The input switch ISW may selectively couple an input of a data voltage Vdata to the first input terminal 1 and the second input terminal 2, based on an offset control signal INVC.

The first feedback switch LSW1 may couple or decouple the first input terminal 1 to or from the output terminal 3, based on the offset control signal INVC. Alternatively, the first feedback switch LSW1 may couple or decouple the second input terminal 2 to or from the output terminal 3, based on the offset control signal INVC.

The second feedback switch LSW2 may couple or decouple the second input terminal 2 to or from the output terminal 3, based on the offset control signal INVC. Alternatively, the second feedback switch LSW2 may couple or decouple the first input terminal 1 to or from the output terminal 3, based on the offset control signal INVC.

The first feedback switch LSW1 and the second feedback switch LSW2 may be turned on/off oppositely and may alternately perform an on/off operation in one horizontal period. While the input of the data voltage Vdata is being coupled to the first input terminal 1, the first feedback switch LSW1 may be turned off, and the second feedback switch LSW2 may be turned on. On the other hand, while the input of the data voltage Vdata is being coupled to the second input terminal 2, the first feedback switch LSW1 may be turned on, and the second feedback switch LSW2 may be turned off. Alternatively, while the input of the data voltage Vdata is being coupled to the first input terminal 1, the first feedback switch LSW1 may be turned on, and the second feedback switch LSW2 may be turned off. On the other hand, while the input of the data voltage Vdata is being coupled to the second input terminal 2, the first feedback switch LSW1 may be turned off, and the second feedback switch LSW2 may be turned on.

Figure 11:
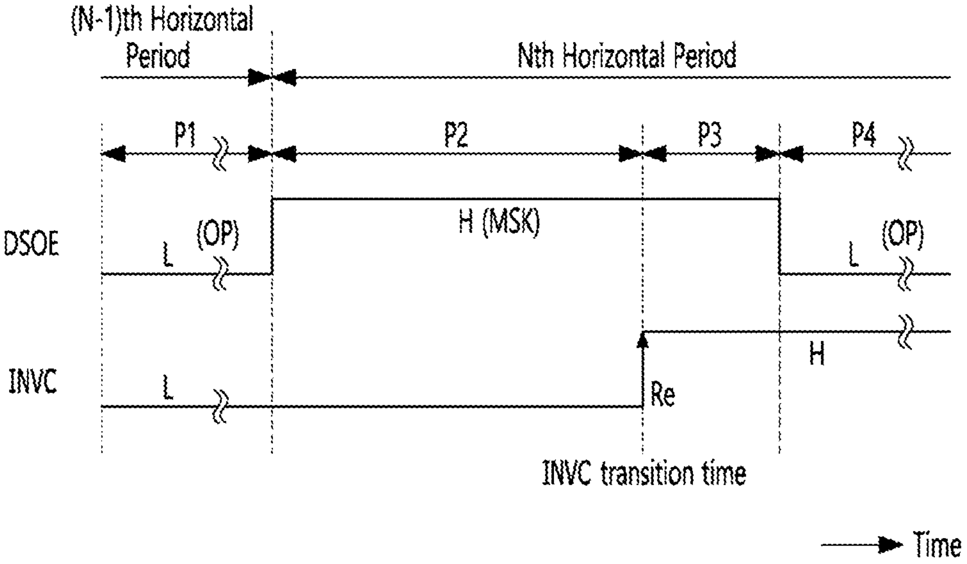
FIG. 11 is a driving waveform diagram of the output buffer of FIG. 10 according to an exemplary embodiment of the disclosure.
Figure 12A:
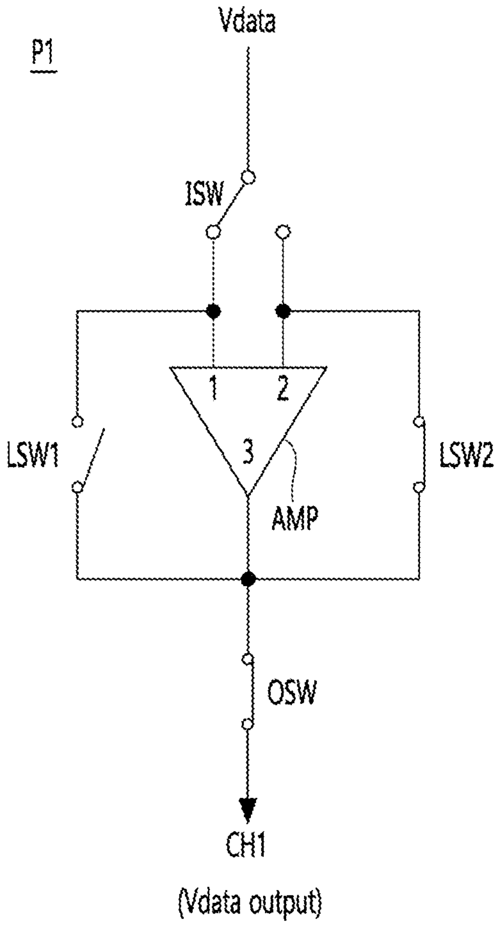
FIG. 12A is an operation state diagram of an output buffer corresponding to a first period of FIG. 10 according to an exemplary embodiment of the disclosure.

FIG. 11 is a driving waveform diagram of the output buffer of FIG. 10 according to an exemplary embodiment of the disclosure. FIG. 12A is an operation state diagram of an output buffer corresponding to a first period of FIG. 10 according to an exemplary embodiment of the disclosure.

Referring to FIG. 11, a masking period MSK and an output period OP of a data voltage Vdata may be defined by a delayed source output enable signal DSOE. The masking period MSK of the data voltage Vdata may be a high level H period of the delayed source output enable signal DSOE, and an output period OP of the data voltage Vdata may be a low level L period of the delayed source output enable signal DSOE. Because an output switch OSW is turned off in the high level H period of the delayed source output enable signal DSOE, a source output may be masked. An offset control signal INVC may be transitioned from the low level L to the high level H in the masking period MSK of the data voltage Vdata. Because the output switch OSW is turned on in the low level L period of the delayed source output enable signal DSOE, the source output may be enabled. Depending on type of output switch, The masking period MSK of the data voltage Vdata may also be a low level L period of the delayed source output enable signal DSOE, and an output period OP of the data voltage Vdata may be a high level H period of the delayed source output enable signal DSOE.

Referring to FIG. 11, a driving sequence of an output buffer may be divided into first to fourth periods P1 to P4 by the delayed source output enable signal DSOE and the offset control signal INVC. The first period P1 may be included in an $(N-1)^{th}$ horizontal period, and the second to fourth periods P2 to P4 may be included in an $N^{th}$ horizontal period.

Referring to FIG. 12A, in the first period P1, the input switch ISW may decouple an input of an $(N-1)^{th}$ data voltage Vdata from the first input terminal 1, based on the offset control signal INVC having the low level L. Also, based on the offset control signal INVC having the low level L, the first feedback switch LSW1 may be turned off, and the second feedback switch LSW2 may be turned on. The second feedback switch LSW2 may couple the second input terminal 2 to the output terminal 3. At this time, the $(N-1)^{th}$ data voltage Vdata may be buffered in the amplifier circuit CAMP, and then, may be applied to the output switch OSW.

In the first period P1, the output switch OSW may be turned on based on the delayed source output enable signal DSOE having the low level L, and the $(N-1)^{th}$ data voltage Vdata may be output to a data line through a first source channel CH1.

Figure 12B:
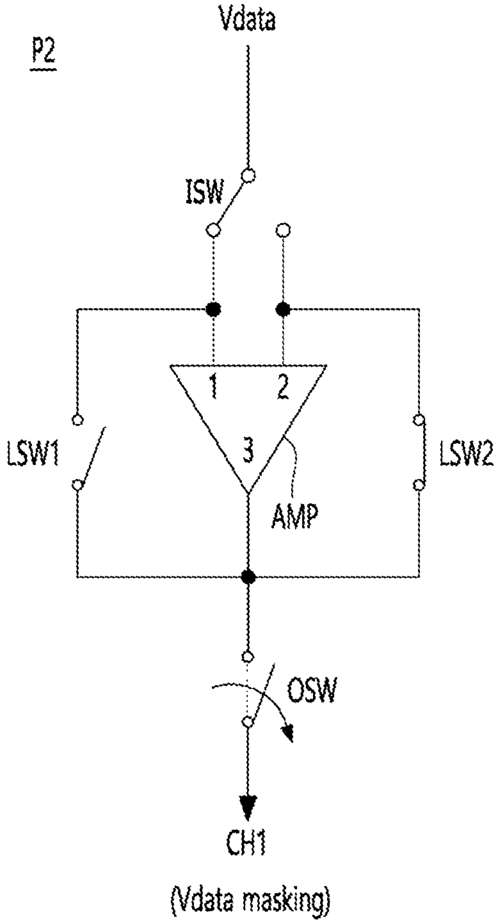
FIG. 12B is an operation state diagram of an output buffer corresponding to a second period of FIG. 10 according to an exemplary embodiment of the disclosure.

Referring to FIG. 12B, in the second period P2, the input switch ISW and the first and second feedback switches LSW1 and LSW2 may maintain an operation state of the first period P1, based on the offset control signal INVC having the low level L.

In the second period P2, the output switch OSW may be turned off based on the delayed source output enable signal DSOE having the high level H and may mask a source output.

Figure 12C:
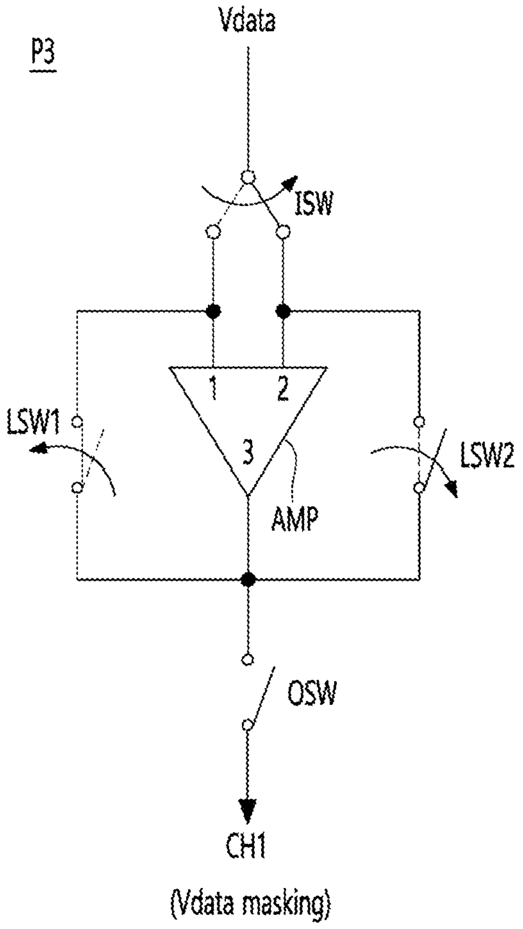
FIG. 12C is an operation state diagram of an output buffer corresponding to a third period of FIG. 10 according to an exemplary embodiment of the disclosure.

Referring to FIG. 12C, in the third period P3, the output switch OSW may be turned off based on the delayed source output enable signal DSOE having the high level H and may mask the source output. In the third period P3, when the offset control signal INVC is transitioned from the low level L to the high level H, an operation state of each of the input switch ISW and the first and second feedback switches LSW1 and LSW2 may be changed. In the third period P3, the input switch ISW may couple an input of an $N^{th}$ data voltage Vdata, based on the offset control signal INVC having the high level H. Also, based on the offset control signal INVC having the high level H, the first feedback switch LSW1 may be turned on, and the second feedback switch LSW2 may be turned off. The first feedback switch LSW1 may couple the first input terminal 1 to the output terminal 3. At this time, the $N^{th}$ data voltage Vdata may be buffered in the amplifier circuit CAMP, and then, may be applied to the output switch OSW.

Figure 12D:
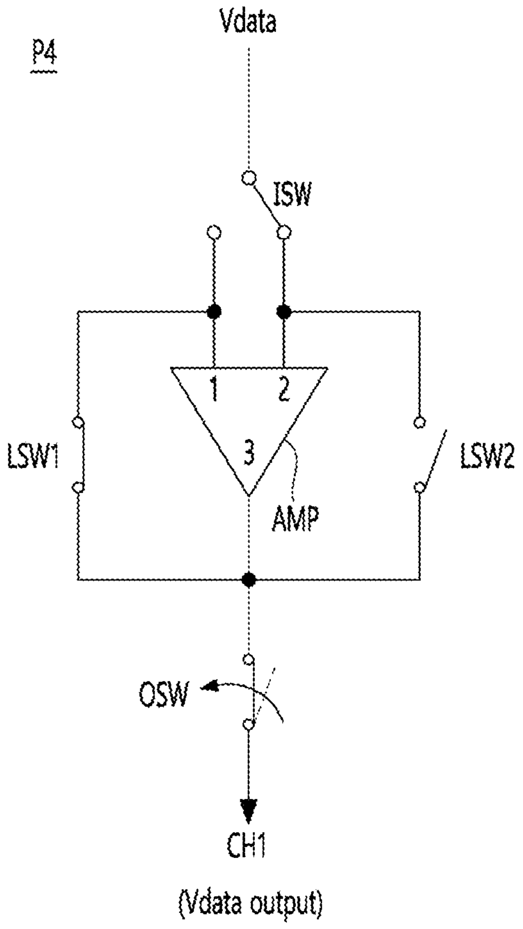
FIG. 12D is an operation state diagram of an output buffer corresponding to a fourth period of FIG. 10 according to an exemplary embodiment of the disclosure.

Referring to FIG. 12D, in the fourth period P4, the input switch ISW and the first and second feedback switches LSW1 and LSW2 may maintain an operation state of the third period P3, based on the offset control signal INVC having the high level H.

In the fourth period P4, the output switch OSW may be turned on based on the delayed source output enable signal DSOE having the low level L, and the $N^{th}$ data voltage Vdata may be output to a data line through the first source channel CH1.

Figure 13:
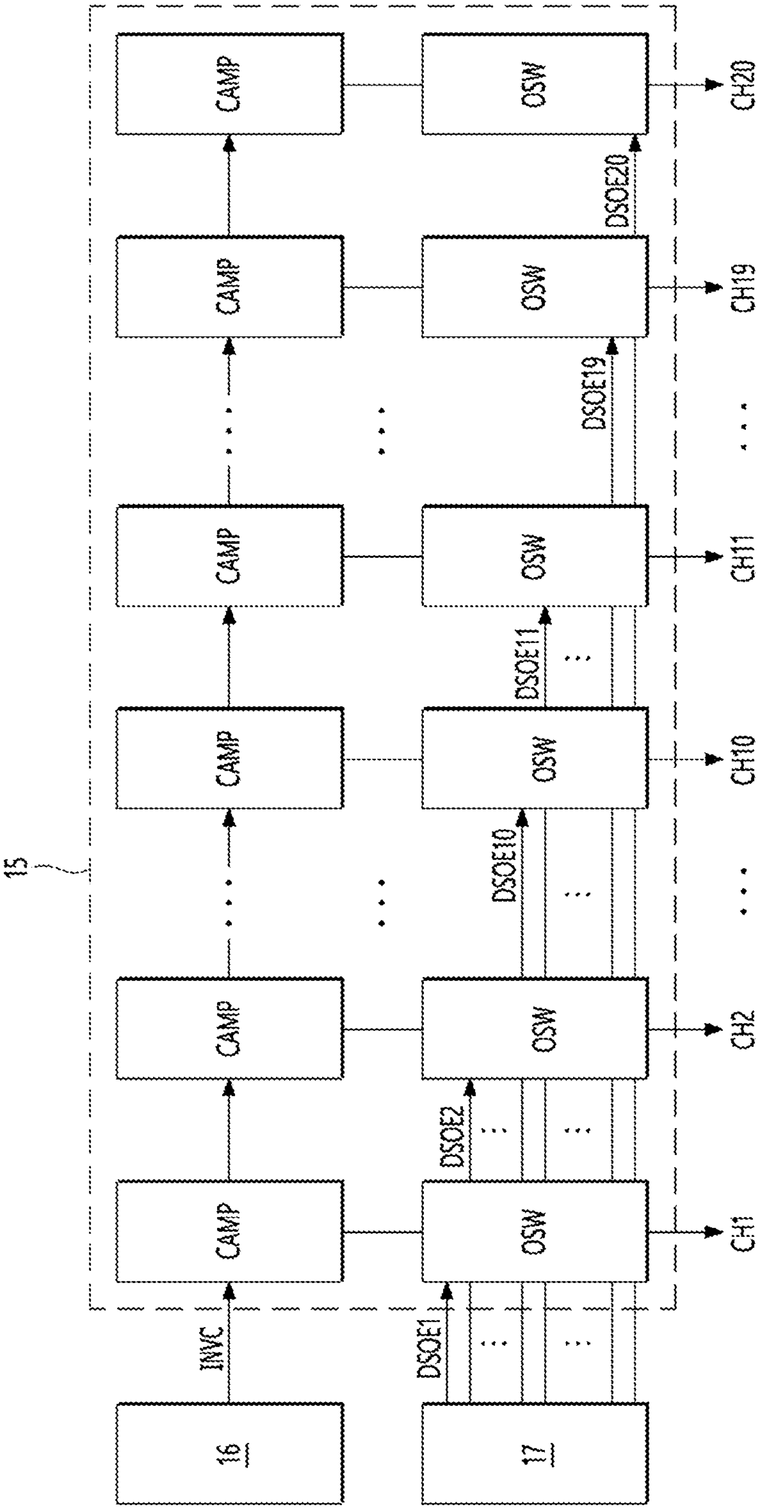
FIG. 13 is a diagram illustrating an example of a connection configuration between an offset control circuit, a source output control circuit, and an output buffer circuit of FIG. 8 according to an exemplary embodiment of the disclosure.

FIG. 13 is a diagram illustrating an example of a connection configuration between an offset control circuit, a source output control circuit, and an output buffer circuit of FIG. 8 according to an exemplary embodiment of the disclosure.

Referring to FIG. 13, an output buffer circuit 15 may include 20 amplifier circuits CAMP respectively corresponding to first to 20th source output channels CH1 to CH20 and 20 output switches OSW.

A source output control circuit 17 may individually apply 20 source output enable signals DSOE1 to DSOE20, which are sequentially delayed, to the 20 output switches OSW to delay a source output period by units of source output channels, based on the degree of delay of a gate signal. The 20 source output enable signals DSOE1 to DSOE20 may include 20 masking periods which are sequentially delayed and 20 output periods which are sequentially delayed.

An offset control circuit 16 may apply the offset control signal INVC, which is transitioned at a common timing, to the 20 amplifier circuits CAMP and may switch an offset of each of the amplifier circuits CAMP from (+) to (−) or in the reverse order thereof. The common timing may be designed previously as a specific timing within a time which is allocated for operations of first to $20^{th}$ source output channels CH1 to CH20.

Figure 14:
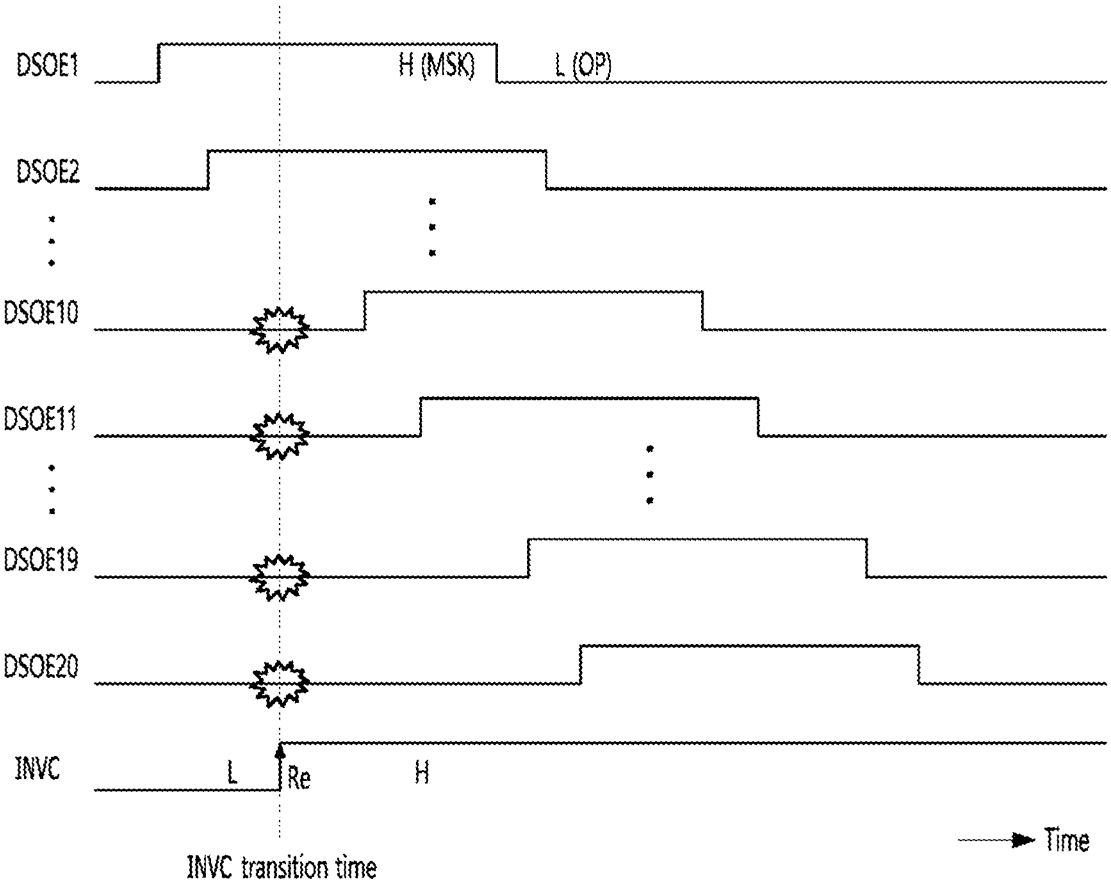
FIG. 14 is a driving waveform diagram for differently implementing position-based source delay in the output buffer circuit of FIG. 13 according to an exemplary embodiment of the disclosure.
Figure 15:
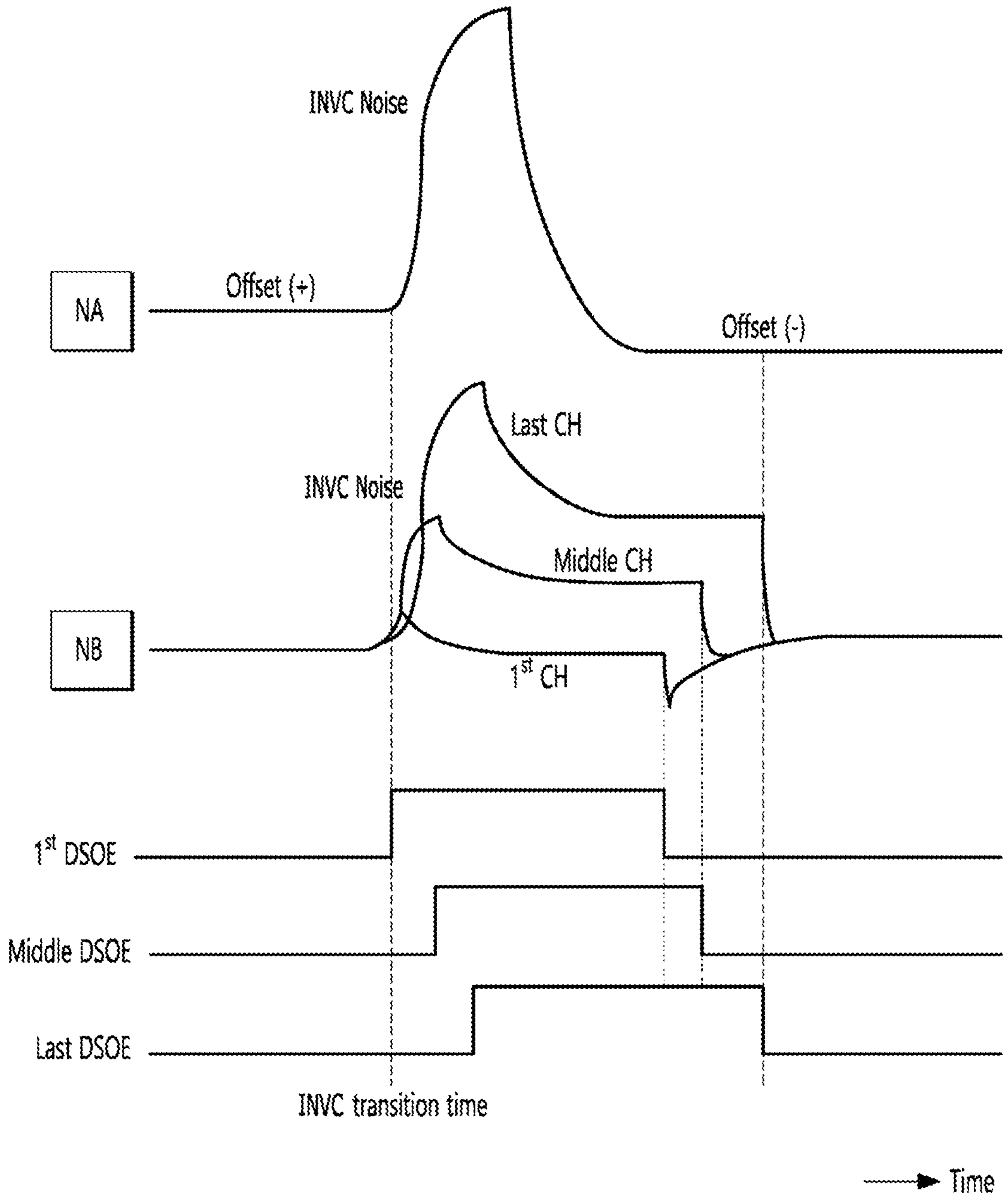
FIG. 15 is a diagram illustrating INVC noise occurring at an INVC transition timing of FIG. 14 according to an exemplary embodiment of the disclosure.

FIG. 14 is a driving waveform diagram for differently implementing position-based source delay in the output buffer circuit of FIG. 13 according to an exemplary embodiment of the disclosure. FIG. 15 is a diagram illustrating INVC noise occurring at an INVC transition timing of FIG. 14 according to an exemplary embodiment of the disclosure.

Referring to FIG. 14, the offset control circuit 16 may transit an offset control signal INVC at a common timing overlapping only some of 20 masking periods MSK. In this case, in source output channels where the common timing overlaps an output period OP, offset switching noise (hereinafter referred to as INVC noise) may not be masked and may be output with being mixed with a source output.

Referring to FIG. 15, INVC noise may be reflected in a first node (NA of FIG. 10) of the amplifier circuit CAMP when an amplifier offset is changed, and in source output channels where output switches OSW are turned on, the INVC noise may be reflected in source outputs of second nodes (NB of FIG. 10) and shown. A magnitude of the INVC noise reflected in the source outputs of second nodes (NB of FIG. 10) may be smallest in a first source output channel where the output switch OSW is turned off and may be largest in a $20^{th}$ source output channel where the output switch OSW is turned on.

When the INVC noise reflected in the source output is large, block dim may be recognized in a pixel column connected with a corresponding source output channel. Accordingly, in the following embodiment, various methods for masking the INVC noise will be described.

Figure 16:
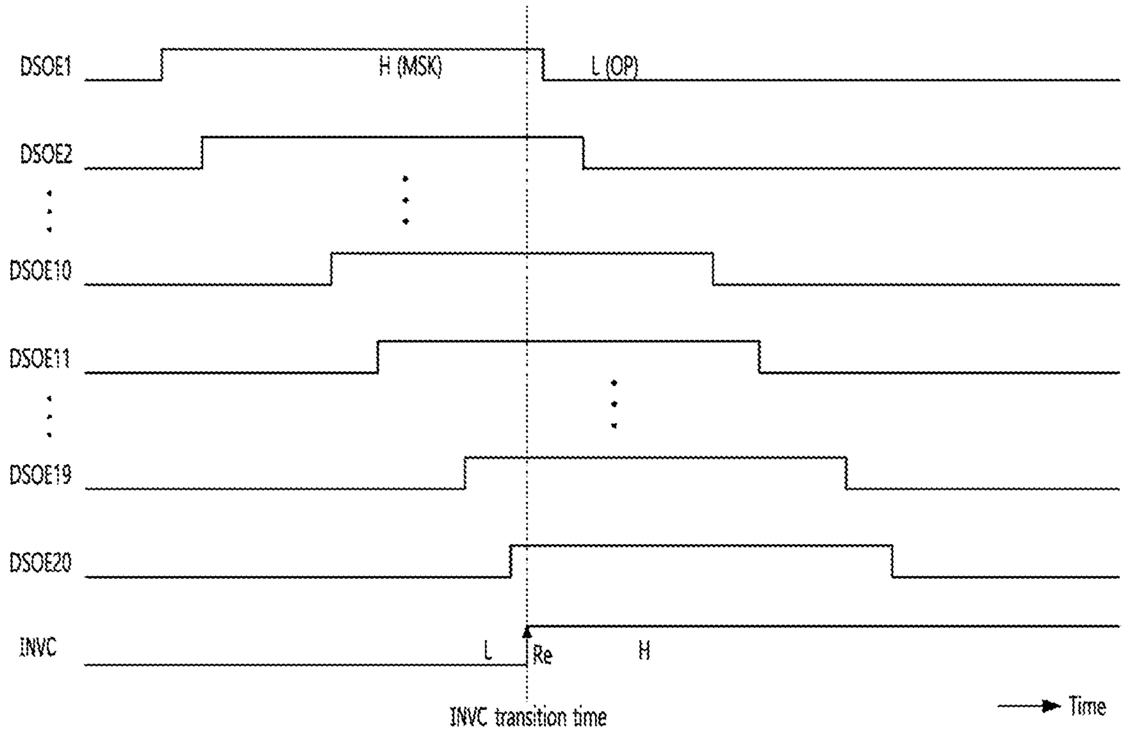
FIG. 16 is another driving waveform diagram for differently setting position-based source delay and reducing INVC noise in the output buffer circuit of FIG. 13 according to an exemplary embodiment of the disclosure.
Figure 17:
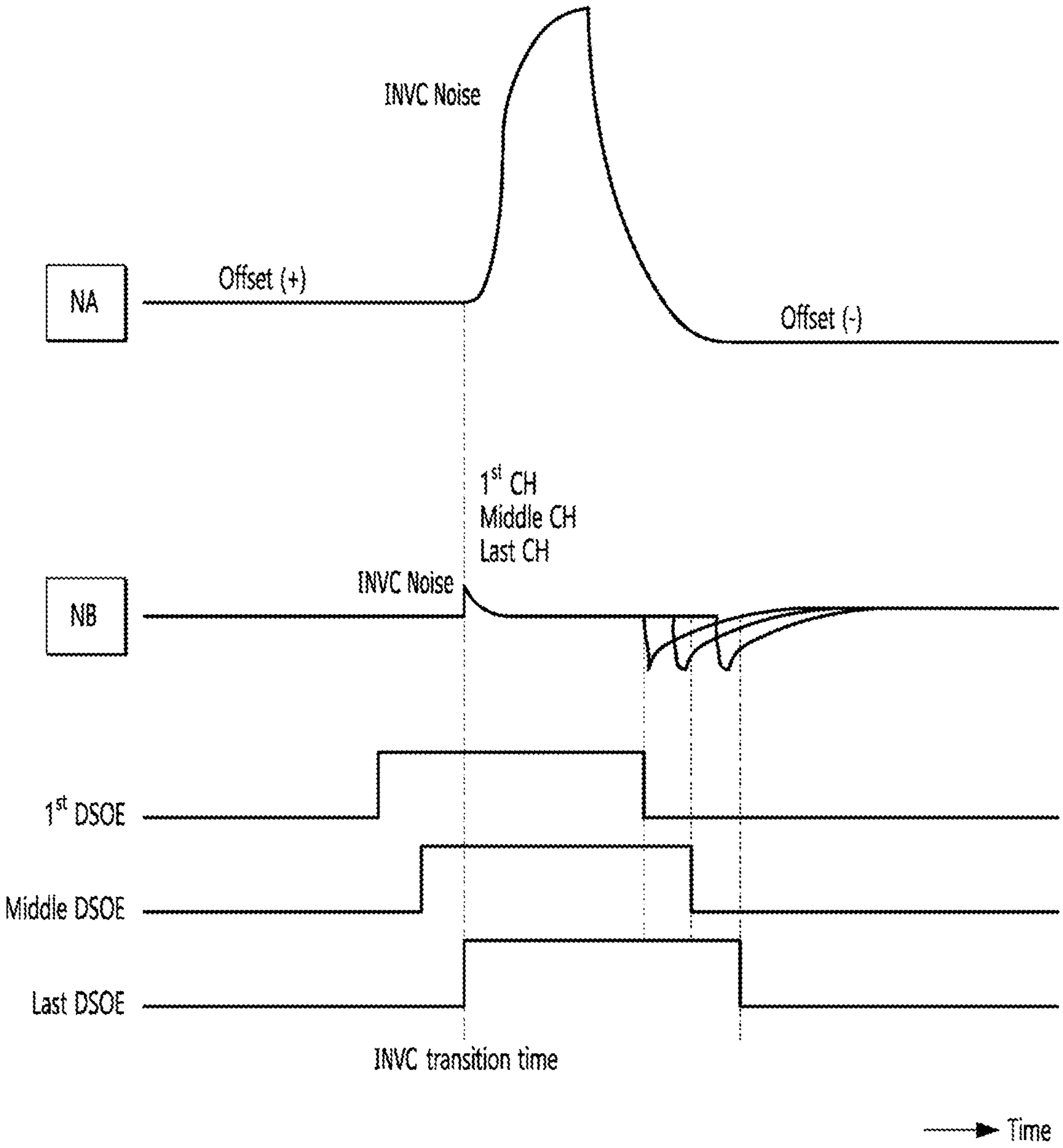
FIG. 17 is a diagram illustrating an example where INVC noise is reduced at an INVC transition timing of FIG. 16 according to an exemplary embodiment of the disclosure.

FIG. 16 is another driving waveform diagram for differently setting position-based source delay FIG. 16 is another driving waveform diagram for differently setting position-based source delay and reducing INVC noise in the output buffer circuit of FIG. 13 according to an exemplary embodiment of the disclosure. FIG. 17 is a diagram illustrating an example where INVC noise is reduced at an INVC transition timing of FIG. 16 according to an exemplary embodiment of the disclosure.

Referring to FIG. 16, the offset control circuit 16 may transit the offset control signal INVC at a common timing overlapping all of 20 masking periods MSK which are sequentially delayed. In this case, because the masking periods MSK are sequentially delayed with the same length, convenience of design may be provided.

Referring to FIG. 17, INVC noise may be reflected in a first node (NA of FIG. 10) of the amplifier circuit CAMP when an amplifier offset is changed, but because all output switches OSW are in an off state at a common timing at which an offset control signal INVC is transitioned, the INVC noise may not be reflected in source outputs of second nodes (NB of FIG. 10). As a result, the INVC noise may be masked in all of 20 source output channels.

Figure 18:
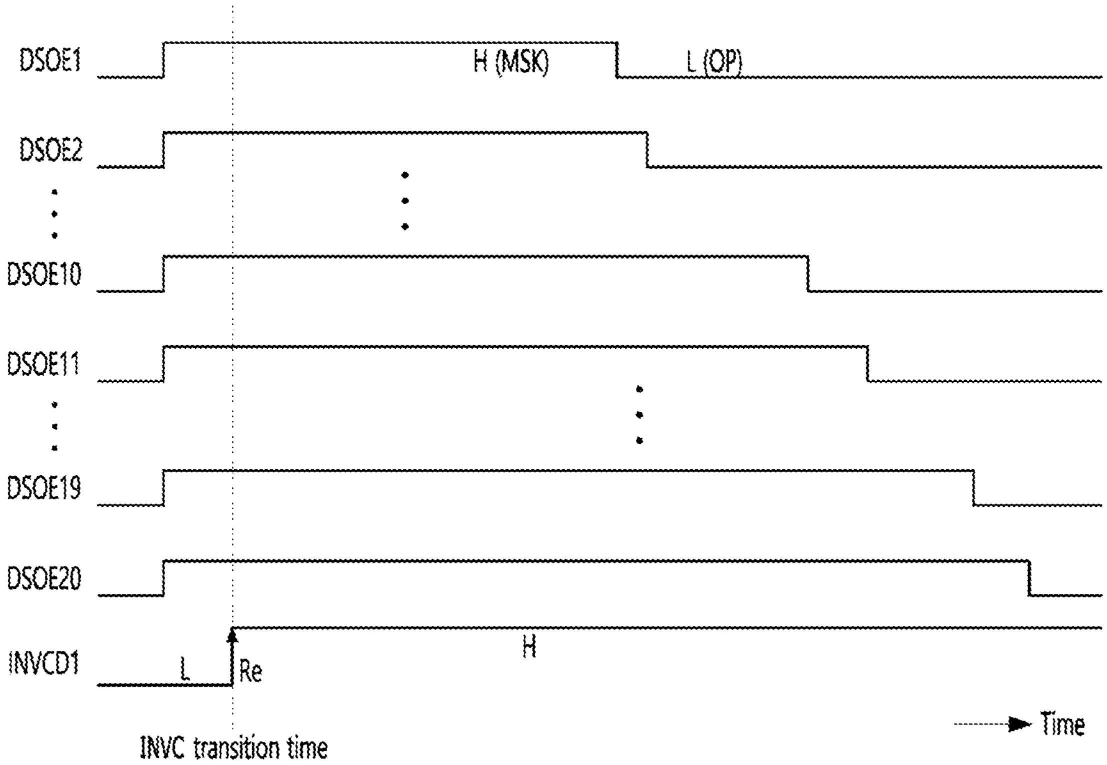
FIG. 18 is another driving waveform diagram for differently setting position-based source delay and reducing INVC noise in the output buffer circuit of FIG. 13 according to an exemplary embodiment of the disclosure.
Figure 19:
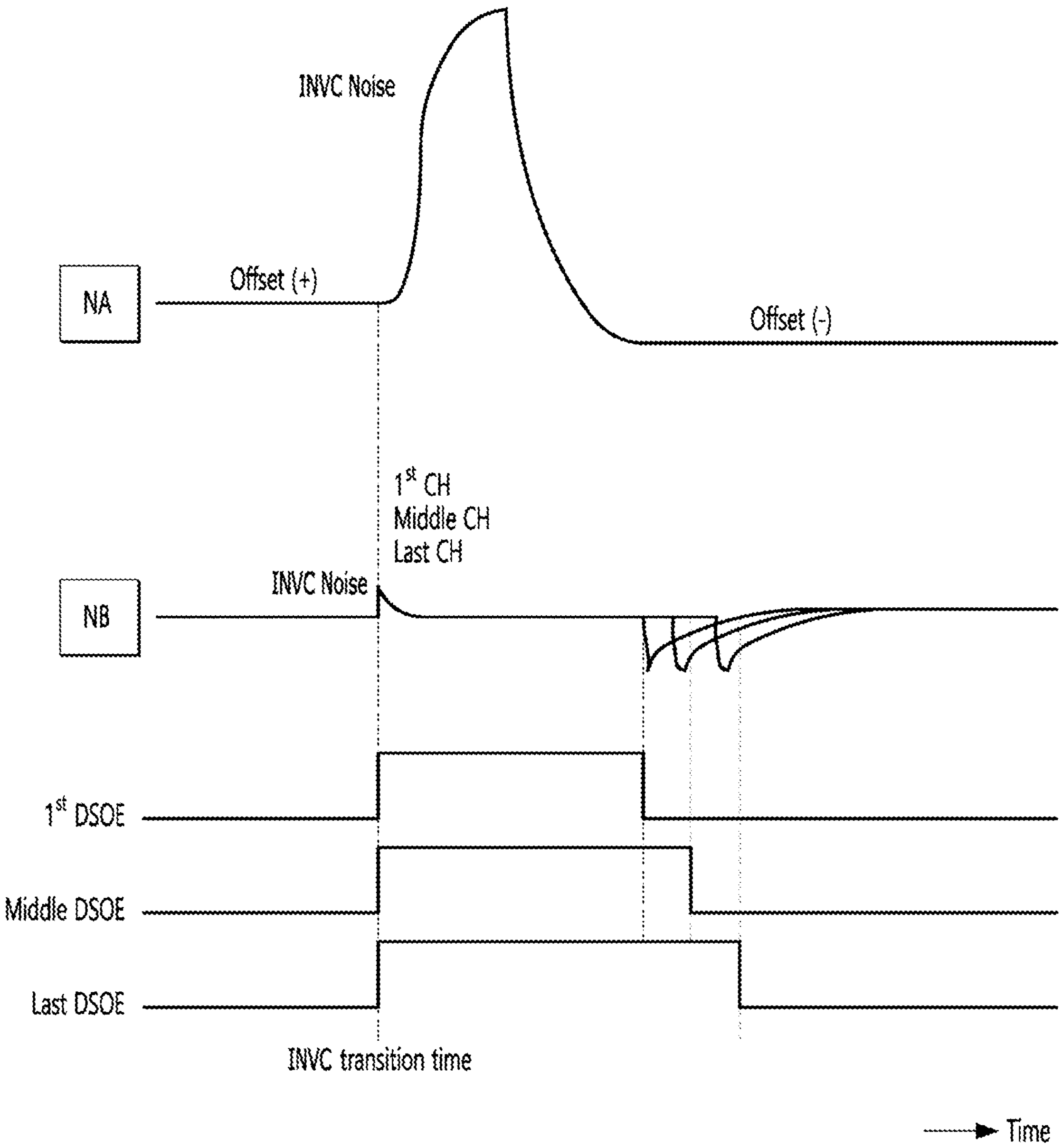
FIG. 19 is a diagram illustrating an example where INVC noise is reduced at an INVC transition timing of FIG. 18 according to an exemplary embodiment of the disclosure.

FIG. 18 is another driving waveform diagram for differently setting position-based source delay and reducing INVC noise in the output buffer circuit of FIG. 13 according to an exemplary embodiment of the disclosure. FIG. 19 is a diagram illustrating an example where INVC noise is reduced at an INVC transition timing of FIG. 18 according to an exemplary embodiment of the disclosure.

Referring to FIG. 18, the offset control circuit 16 may transit an offset control signal INVC at a common timing overlapping all of 20 masking periods MSK which are sequentially delayed. In this case, the masking periods MSK may have the same start time, and an end time thereof may be sequentially delayed. Because the masking periods MSK are sequentially delayed with different lengths, a large margin may be provided in setting the common timing.

Referring to FIG. 19, INVC noise may be reflected in a first node (NA of FIG. 10) of the amplifier circuit CAMP when an amplifier offset is changed, but because all output switches OSW are in an off state at a common timing at which an offset control signal INVC is transitioned, the INVC noise may not be reflected in source outputs of second nodes (NB of FIG. 10). As a result, the INVC noise may be masked in all of 20 source output channels.

Figure 20:
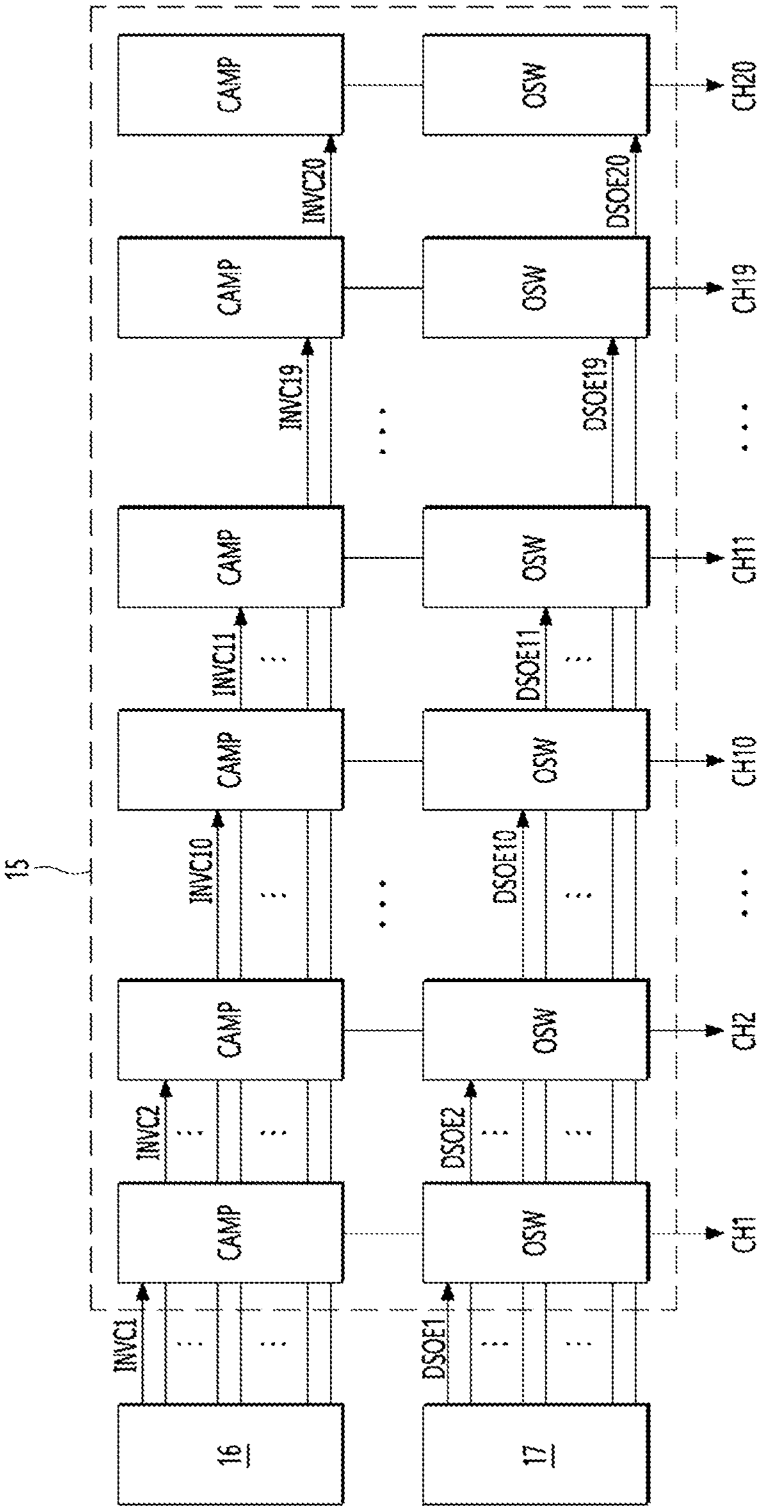
FIG. 20 is a diagram illustrating another example of a connection configuration between an offset control circuit, a source output control circuit, and an output buffer circuit of FIG. 8 according to an exemplary embodiment of the disclosure.
Figure 21:
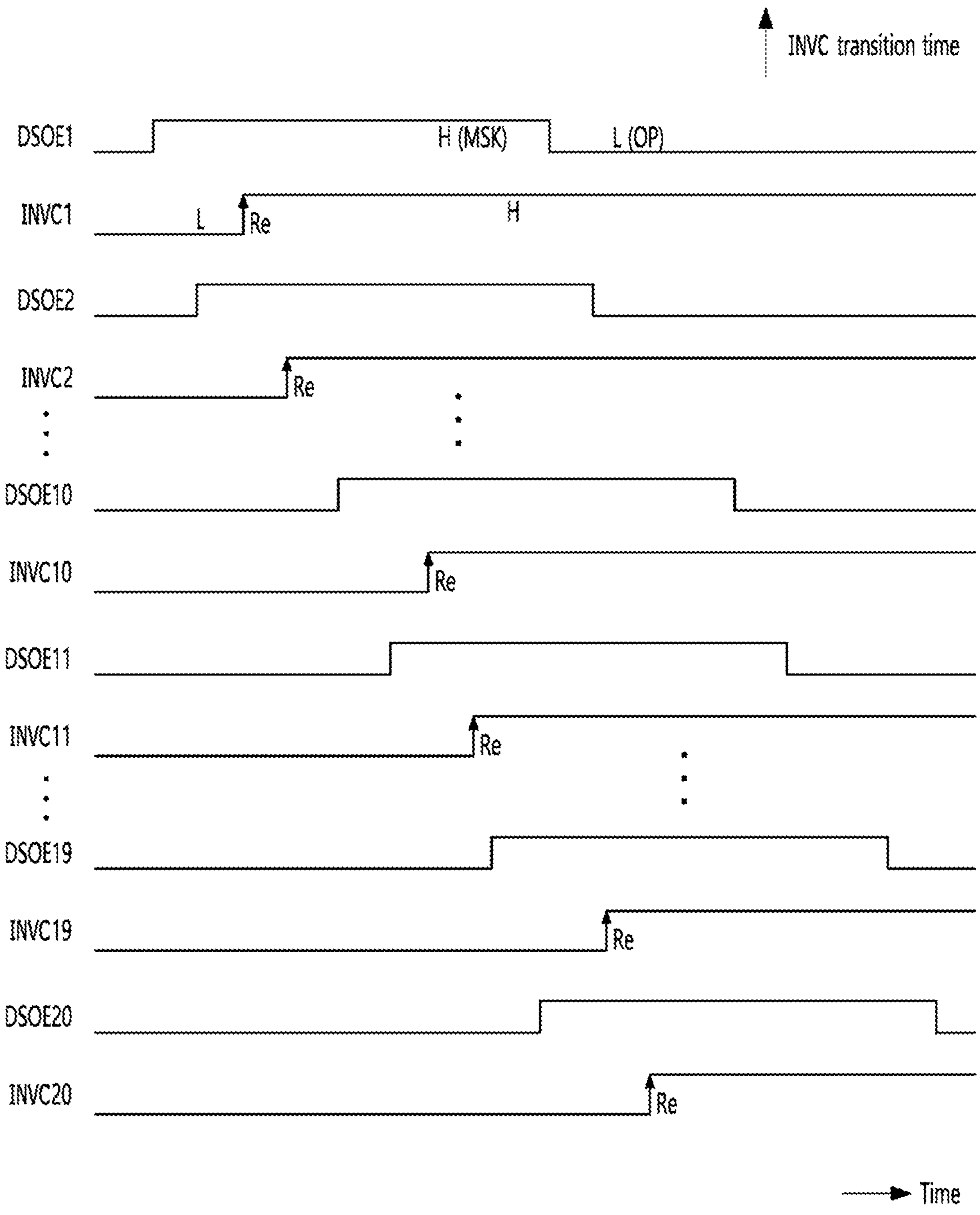
FIG. 21 is a driving waveform diagram for differently setting position-based source delay and reducing INVC noise in the output buffer circuit of FIG. 20 according to an exemplary embodiment of the disclosure.
Figure 22:
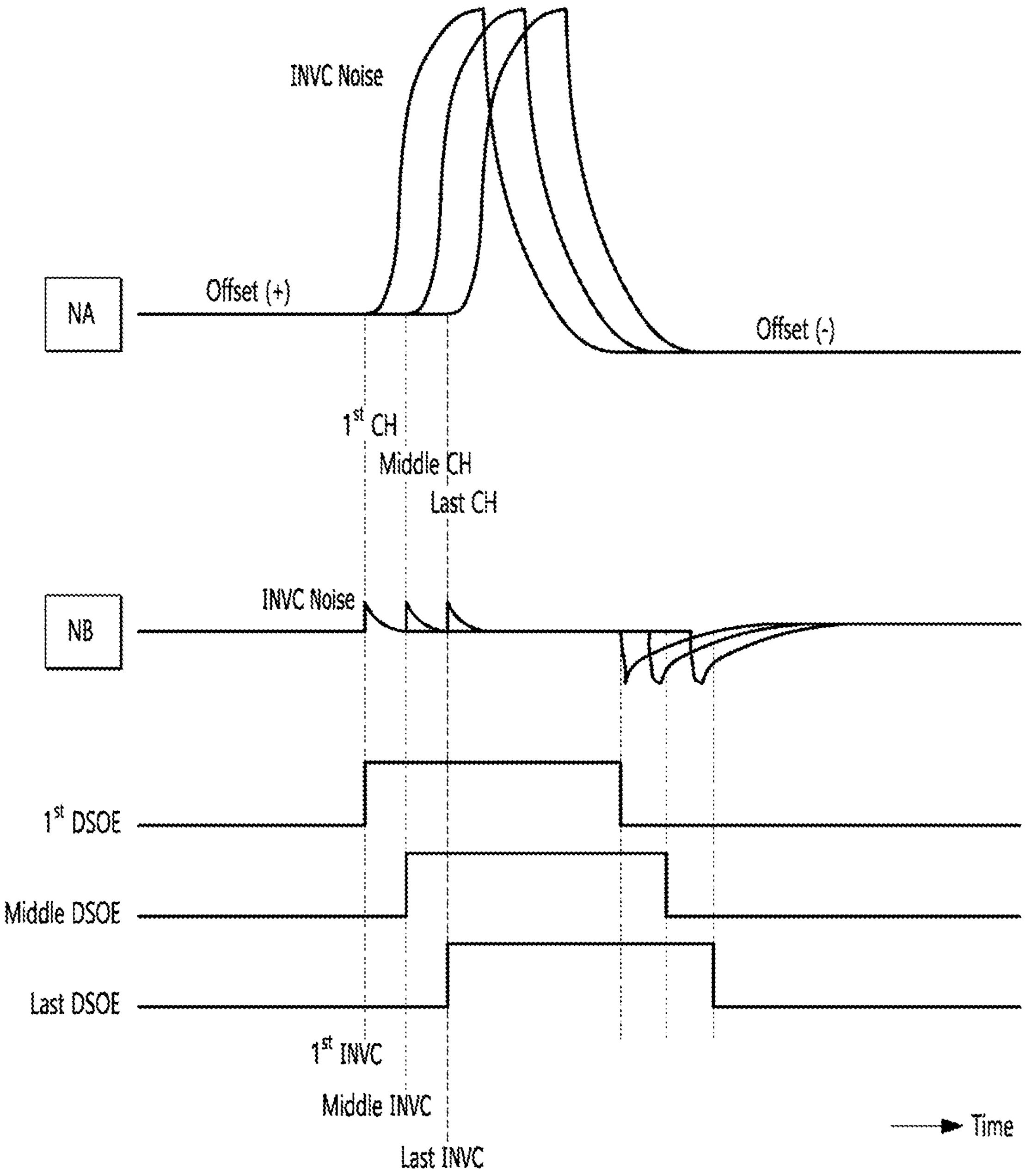
FIG. 22 is a diagram illustrating an example where INVC noise is reduced at INVC transition timings of FIG. 21 according to an exemplary embodiment of the disclosure.

FIG. 20 is a diagram illustrating another example of a connection configuration between an offset control circuit, a source output control circuit, and an output buffer circuit of FIG. 8 according to an exemplary embodiment of the disclosure. FIG. 21 is a driving waveform diagram for differently setting position-based source delay and reducing INVC noise in the output buffer circuit of FIG. 20 according to an exemplary embodiment of the disclosure. FIG. 22 is a diagram illustrating an example where INVC noise is reduced at INVC transition timings of FIG. 21 according to an exemplary embodiment of the disclosure.

Referring to FIGS. 20 and 21, an output buffer circuit 15 may include 20 amplifier circuits CAMP respectively corresponding to first to $20^{th}$ source output channels CH1 to CH20 and 20 output switches OSW.

A source output control circuit 17 may individually apply 20 source output enable signals DSOE1 to DSOE20, which are sequentially delayed, to the 20 output switches OSW to delay a source output period by units of source output channels, based on the degree of delay of a gate signal. The 20 source output enable signals DSOE1 to DSOE20 may include 20 masking periods MSK which are sequentially delayed and 20 output periods OP which are sequentially delayed.

An offset control circuit 16 may individually apply 20 offset control signals INVC1 to INVC20, which are transitioned at individual timings of the 20 sequentially delayed masking periods MSK, to the 20 amplifier circuits CAMP and may switch an offset of each of the amplifier circuits CAMP from (+) to (−) or in the order thereof.

Referring to FIG. 22, INVC noise may be reflected in a first node (NA of FIG. 10) of the amplifier circuit CAMP when an amplifier offset is changed, but because all output switches OSW are in an off state at individual timings at which the offset control signals INVC1 to INVC20 are transitioned, the INVC noise may not be reflected in source outputs of second nodes (NB of FIG. 10). As a result, the INVC noise may be masked in all of 20 source output channels.

Figure 23:
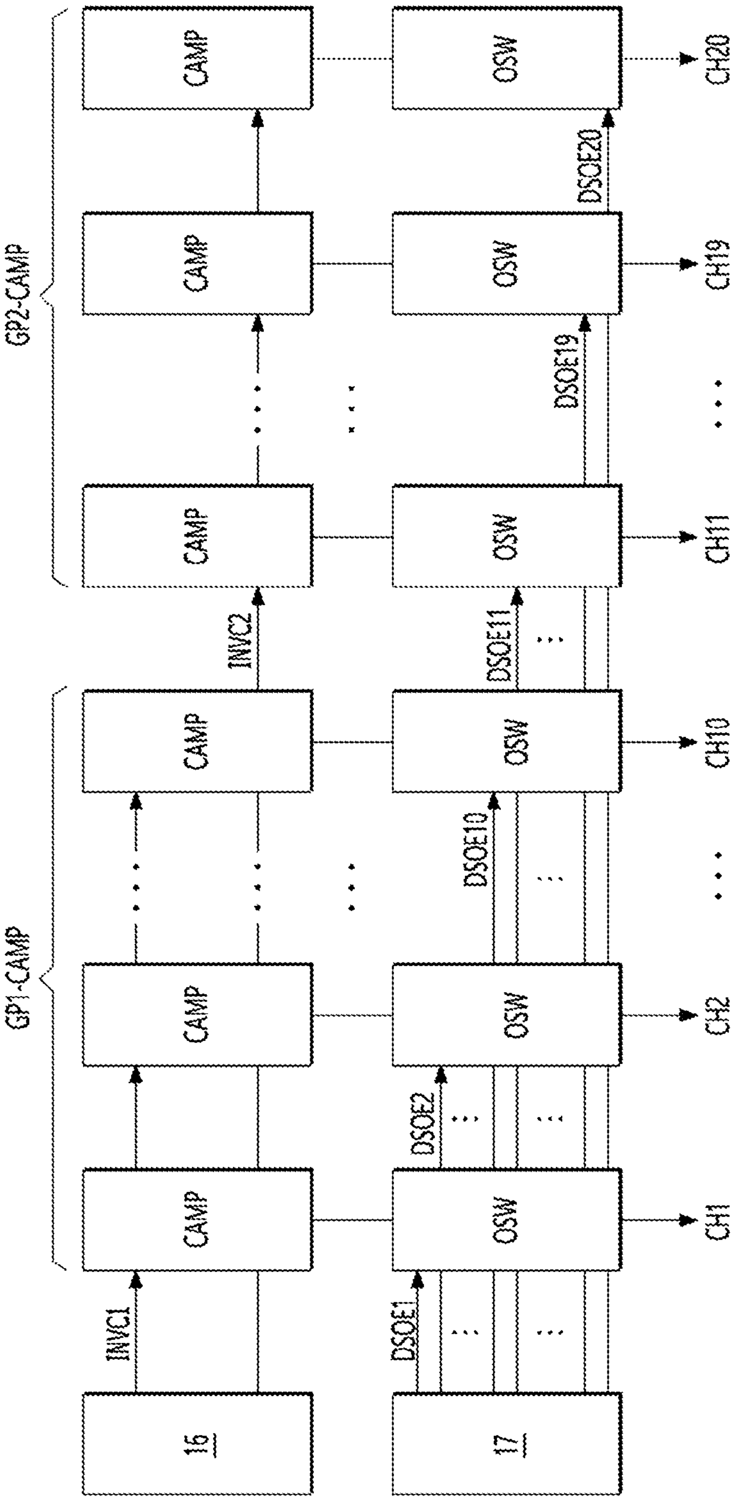
FIG. 23 is a diagram illustrating another example of a connection configuration between an offset control circuit, a source output control circuit, and an output buffer circuit of FIG. 8 according to an exemplary embodiment of the disclosure.
Figure 24:
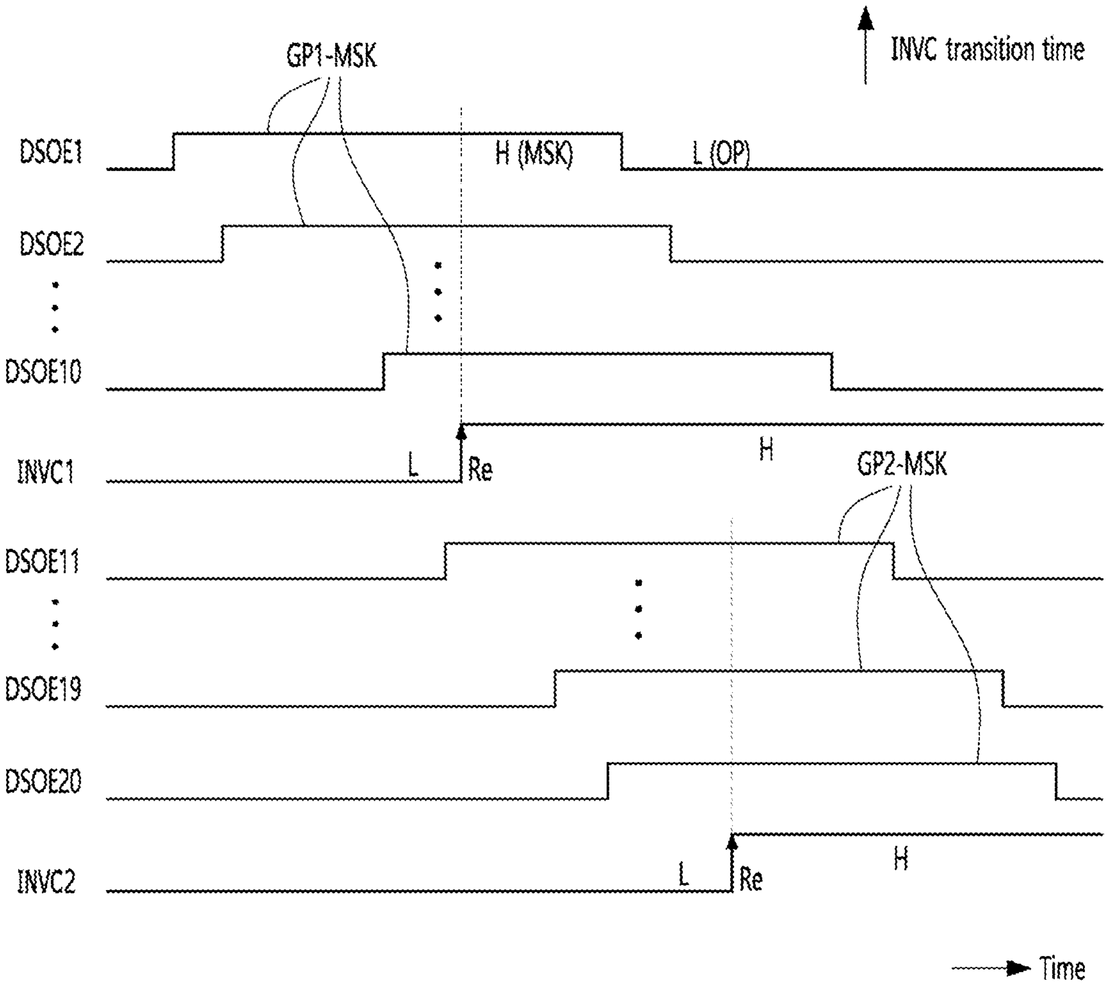
FIG. 24 is a driving waveform diagram for differently setting position-based source delay and reducing INVC noise in the output buffer circuit of FIG. 23 according to an exemplary embodiment of the disclosure.

FIG. 23 is a diagram illustrating another example of a connection configuration between the offset control circuit, the source output control circuit, and the output buffer circuit of FIG. 8 according to an exemplary embodiment of the disclosure. FIG. 24 is a driving waveform diagram for differently setting position-based source delay and reducing INVC noise in the output buffer circuit of FIG. 23 according to an exemplary embodiment of the disclosure.

Referring to FIGS. 23 and 24, an output buffer circuit 15 may include 20 amplifier circuits CAMP respectively corresponding to first to $20^{th}$ source output channels CH1 to CH20 and 20 output switches OSW. The 20 amplifier circuits CAMP may be grouped into groups each including ten amplifier circuits CAMP, and for example, may be grouped into a first group of amplifier circuits GP1-CAMP and a second group of amplifier circuits GP2-CAMP, but is not limited thereto, and may be grouped into more than two groups.

A source output control circuit 17 may individually apply 20 sequentially delayed source output enable signals DSOE1 to DSOE20 to the 20 output switches OSW to delay a source output period by units of source output channels, based on the degree of delay of a gate signal. The 20 source output enable signals DSOE1 to DSOE20 may include 20 sequentially delayed masking periods MSK and 20 sequentially delayed output periods OP. The 20 masking periods MSK may be grouped into groups each including ten masking periods MSK, and for example, may be grouped into a first group of masking periods GP1-MSK and a second group of masking periods GP2-MSK.

An offset control circuit 16 may apply a first offset control signal INVC1 to the masking periods GP1-MSK of the first group in common in the masking periods GP1-MSK, sequentially delayed, of the first group to switch an offset of each of the masking periods GP1-MSK of the first group from (+) to (−) or in the order thereof.

Moreover, the offset control circuit 16 may apply a second offset control signal INVC2 to the masking periods GP2-MSK of the second group in common in the masking periods GP2-MSK, sequentially delayed, of the second group to switch an offset of each of the masking periods GP2-MSK of the second group from (+) to (−) or in the reverse order thereof.

The first offset control signal INVC1 may be transitioned at a first common timing in the masking periods GP1-MSK of the first group, and the second offset control signal INVC2 may be transitioned at a second common timing in the masking periods GP2-MSK of the second group. In this case, because the first common timing differs from the second common timing, each of the 20 masking periods MSK may be designed to be short. An output period OP may increase when the masking period MSK is reduced in one horizontal period, the embodiments of FIGS. 23 and 24 may provide a sufficient pixel charging time in one horizontal period.

The present embodiment may realize the following effects.

In the present embodiment, because an output period of a data signal is delayed by units of source output channels on the basis of the degree of delay of a gate signal, image quality may increase by compensating for a position-based charging deviation of a display panel.

In the present embodiment, as an offset control signal generated based on sequentially delayed source output enable signals is applied to amplifier circuits, an offset of each of the amplifier circuits may be changed from "+" to "−" or in the reverse order thereof, and thus, an adverse effect of an amplifier offset may be reduced.

In the present embodiment, an offset of each amplifier circuit may be changed from "+" to "−" or in the reverse order thereof in a masking period of a data signal, and thus, offset switching noise may be prevented from being reflected in a source output.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus comprising:

a display panel where one pixel line including a plurality of pixels are provided in plurality;

a gate driver configured to apply a gate signal to the one pixel line; and a source driver configured to apply a data signal to the one pixel line, wherein the source driver comprises:

a plurality of amplifier circuits corresponding to a plurality of source output channels, respectively;

a plurality of output switches electrically connected between the plurality of amplifier circuits and the plurality of source output channels, respectively; and a source output control circuit configured to apply sequentially delayed source output enable signals to the plurality of output switches to delay an output timing of the data signal by units of source output channels, based on a degree of delay of the gate signal.

2. The display apparatus of claim 1, wherein the source driver further comprises an offset control circuit configured to apply an offset control signal generated based on the sequentially delayed source output enable signals to the plurality of amplifier circuits to change an offset of each of the plurality of amplifier circuits in a masking period in which no data signal.

3. The display apparatus of claim 2, wherein the offset control signal is transitioned in the masking period, and wherein the offset of each of the plurality of amplifier circuits is changed from (+) to (−) or from positive (+) to negative (−) or from negative (−) to positive (+) in synchronization with a transition timing of the offset control signal.

4. The display apparatus of claim 3, wherein the masking period and an output period for outputting data signal constitute one horizontal period for an operation of the one pixel line, wherein the offset control signal corresponding to the same source output channel is transitioned at a period of one horizontal period, and wherein the offset of each of the plurality of amplifier circuits is changed from positive (+) to negative (−) or from negative (−) to positive (+) in a masking period of one horizontal period and is changed from negative (−) to positive (+) or from positive (+) to negative (−) in a masking period of a next horizontal period of the one horizontal period, in synchronization with a transition timing of the offset control signal.

5. The display apparatus of claim 2, wherein each of the plurality of amplifier circuits comprises:

an amplifier including a first input terminal, a second input terminal, and an output terminal electrically connected with one of the plurality of output switches;

an input switch selectively coupling an input of a data voltage to the first input terminal and the second input terminal, based on the offset control signal;

a first feedback switch coupling or decoupling the first input terminal to or from the output terminal, based on the offset control signal; and a second feedback switch decoupling or coupling the second input terminal from or to the output terminal, based on the offset control signal.

6. The display apparatus of claim 5, wherein, while the input of the data voltage is being coupled to the first input terminal, the first feedback switch is turned off and the second feedback switch is turned on, and while the input of the data voltage is being coupled to the second input terminal, the first feedback switch is turned on and the second feedback switch is turned off.

7. The display apparatus of claim 2, wherein the source output control circuit applies the sequentially delayed source output enable signals, including sequentially delayed masking periods and sequentially delayed output periods, to the plurality of output switches, and wherein the offset control circuit applies an offset control signal, transitioned at a common timing in the sequentially delayed masking periods, to the plurality of amplifier circuits in common.

8. The display apparatus of claim 2, wherein the sequentially delayed masking periods have the same length.

9. The display apparatus of claim 7, wherein the sequentially delayed masking periods have different lengths.

10. The display apparatus of claim 9, wherein the sequentially delayed masking periods have the same start time.

11. The display apparatus of claim 2, wherein the source output control circuit applies the sequentially delayed source output enable signals, including sequentially delayed masking periods and sequentially delayed output periods, to the plurality of output switches, and wherein the offset control circuit individually applies a plurality of offset control signals, transitioned at individual timings in the sequentially delayed masking periods, to the plurality of amplifier circuits.

12. The display apparatus of claim 2, wherein the source output control circuit applies the sequentially delayed source output enable signals, including sequentially delayed masking periods and sequentially delayed output periods, to the plurality of output switches, wherein the offset control circuit applies a corresponding offset control signal to one of a plurality of groups of amplifier circuits among the plurality of amplifier circuits in each of a plurality of groups of masking periods among the sequentially delayed masking periods, wherein the corresponding offset control signal is transitioned at a corresponding common timing in the corresponding group of the masking periods, and wherein the common timings in each group of masking periods differs from each other.

13. The display apparatus of claim 1, wherein the source driver is provided in plurality, an output timing of the data signal is delayed by units of source driver, based on a degree of delay of the gate signal.

* * * * *